(12) United States Patent  
Weeks et al.

(10) Patent No.: US 6,720,058 B1
(45) Date of Patent: Apr. 13, 2004

(54) VELOUR-LIKE PILE ARTICLES AND PILE SURFACE STRUCTURES AND METHODS OF MAKING

(75) Inventors: Gregory Paul Weeks, Hockessin, DE (US); Paul Felix Pustolski, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/555,747

(22) PCT Filed: Dec. 1, 1998

(86) PCT No.: PCT/US98/25425

§ 371 (c)(1),
(2), (4) Date: Jun. 2, 2000

(87) PCT Pub. No.: WO99/29949

PCT Pub. Date: Jun. 17, 1999

Related U.S. Application Data

(60) Provisional application No. 60/067,566, filed on Dec. 5, 1997.

(51) Int. Cl.$^7$ ............................................. D04H 11/00
(52) U.S. Cl. ............................ 428/94; 428/95; 428/89; 428/92; 428/93
(58) Field of Search ............................ 428/85, 89, 92, 428/93, 94, 95

(56) References Cited

U.S. PATENT DOCUMENTS

| | | |
|---|---|---|
| 2,284,152 A | 5/1942 | Knocke |
| 2,602,765 A | 7/1952 | Ahier et al. |
| 2,896,304 A | 7/1959 | Peroni |
| 3,745,061 A | 7/1973 | Champaneria et al. |
| 3,936,577 A | 2/1976 | Christini et al. |
| 4,779,410 A | 10/1988 | Fehrer |
| 4,925,707 A | 5/1990 | Vinod |
| 5,153,046 A | 10/1992 | Murphy |
| 5,230,957 A | 7/1993 | Lin |
| 5,470,629 A | 11/1995 | Mokhtar et al. |
| 5,470,656 A * | 11/1995 | Kennard et al. ............. 428/370 |
| 5,498,459 A * | 3/1996 | Mokhtar et al. ............. 156/166 |
| 5,547,732 A | 8/1996 | Edwards et al. |
| 5,939,166 A | 8/1999 | Cheng et al. |
| 6,096,151 A * | 8/2000 | Edwards et al. ............. 156/173 |

FOREIGN PATENT DOCUMENTS

| | | | |
|---|---|---|---|
| GB | 1 596 570 | 2/1978 | |
| JP | 57-183820 | 11/1982 | |
| JP | 61-62412 | 3/1986 | |
| JP | 5-222661 | 8/1993 | |
| WO | WO 94/19521 | 9/1994 | |
| WO | WO 96/06685 | 3/1996 | |
| WO | WO 96/06965 | 3/1996 | |
| WO | WO 9704150 A1 * | 2/1997 | ............. D02G/3/40 |
| WO | WO 9706003 A1 * | 2/1997 | ............. B32B/3/16 |
| WO | WO 97/06004 | 2/1997 | |
| WO | WO 9803711 A1 * | 1/1998 | ............. D04H/11/00 |

* cited by examiner

*Primary Examiner*—Cheryl A. Juska
(74) *Attorney, Agent, or Firm*—George M. Medwick

(57) ABSTRACT

A pile article having a support strand for attachment to multifilament yarn to form a velour-like pile having loosely entangled filaments in spaced apart monolithic pile rows, a helically wound package of oriented pile articles for shipping and storage, and a pile surface structure comprising pile articles arranged in spaced apart rows on a substrate to form a pile surface that may be flat or moldable, and a method for making a pile surface structure by embedding the pile articles into the backing substrate. The pile surface structures may be usefully employed in automobile mats, carpets and panels.

8 Claims, 22 Drawing Sheets

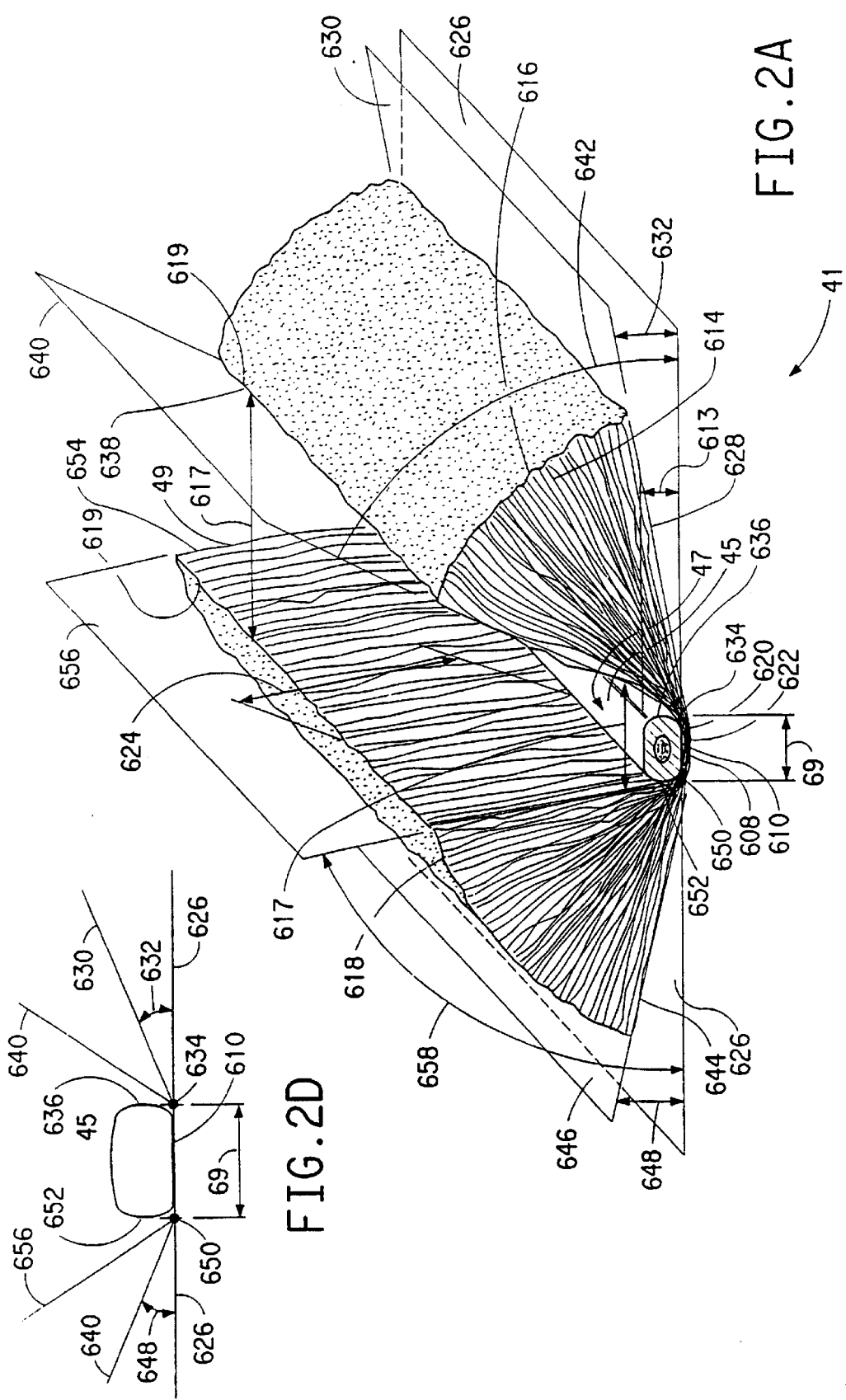

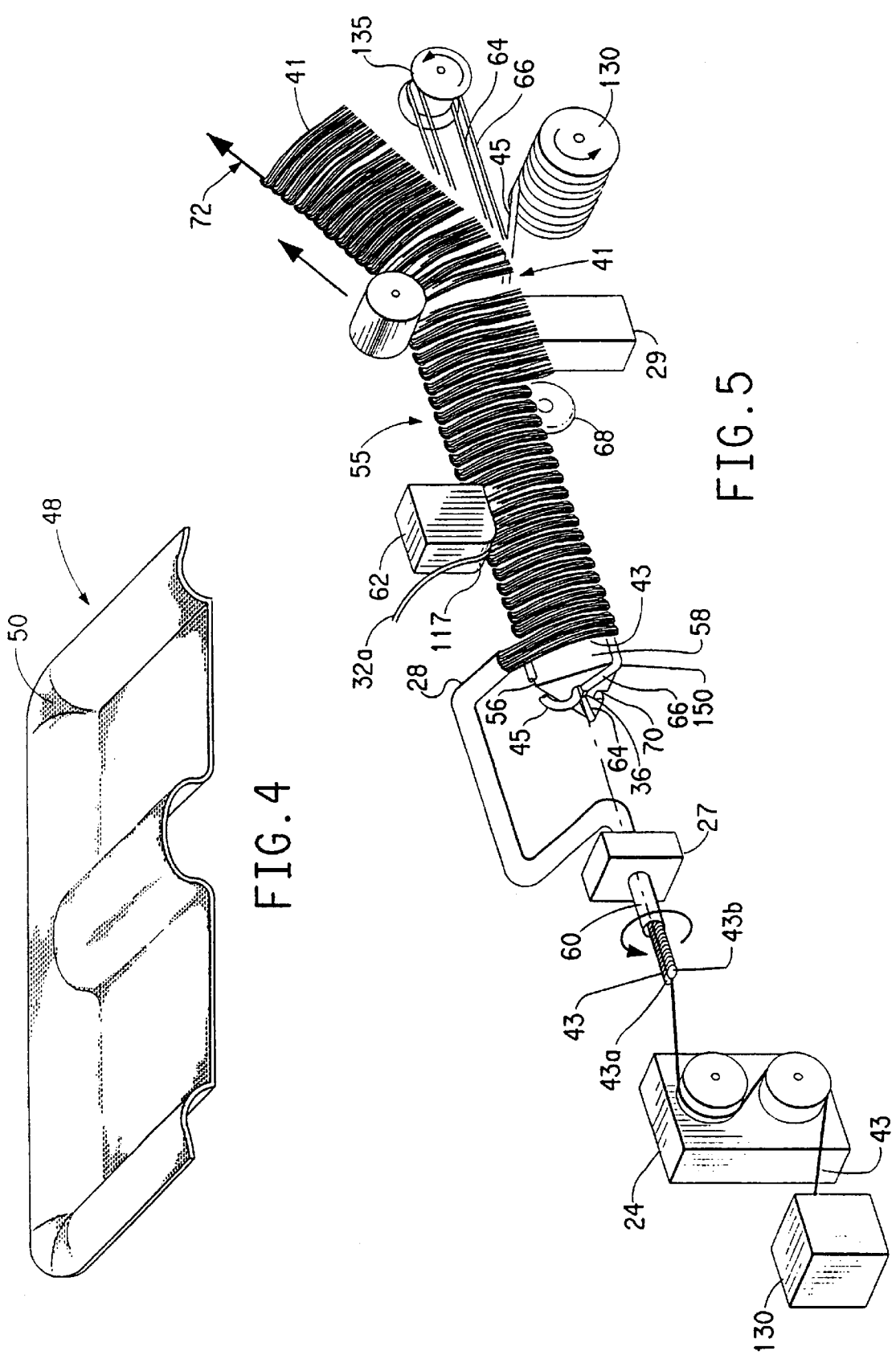

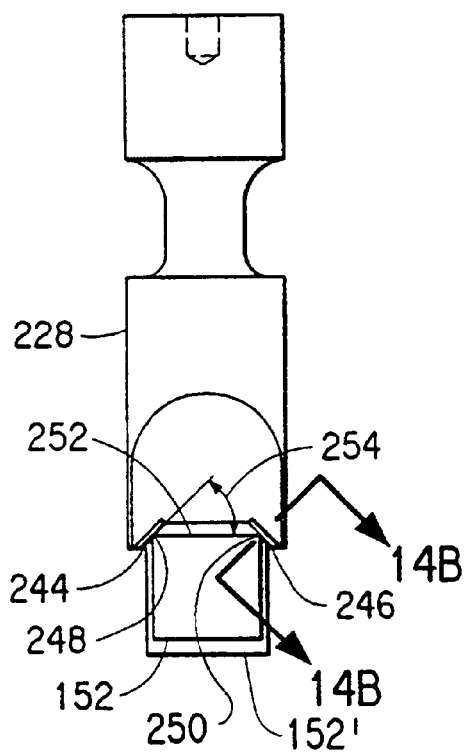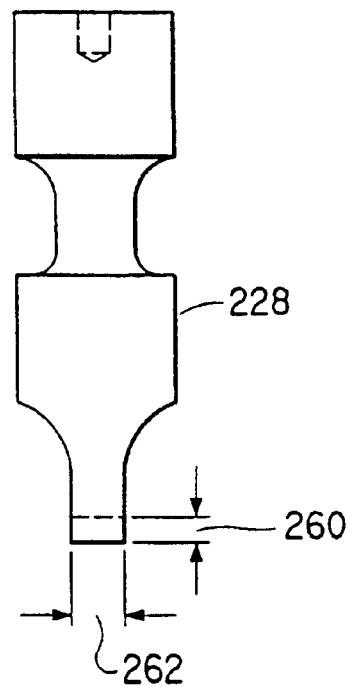
FIG.14A  FIG.14C
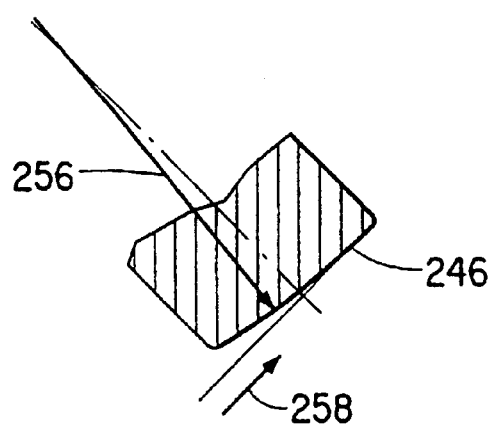
FIG.14B

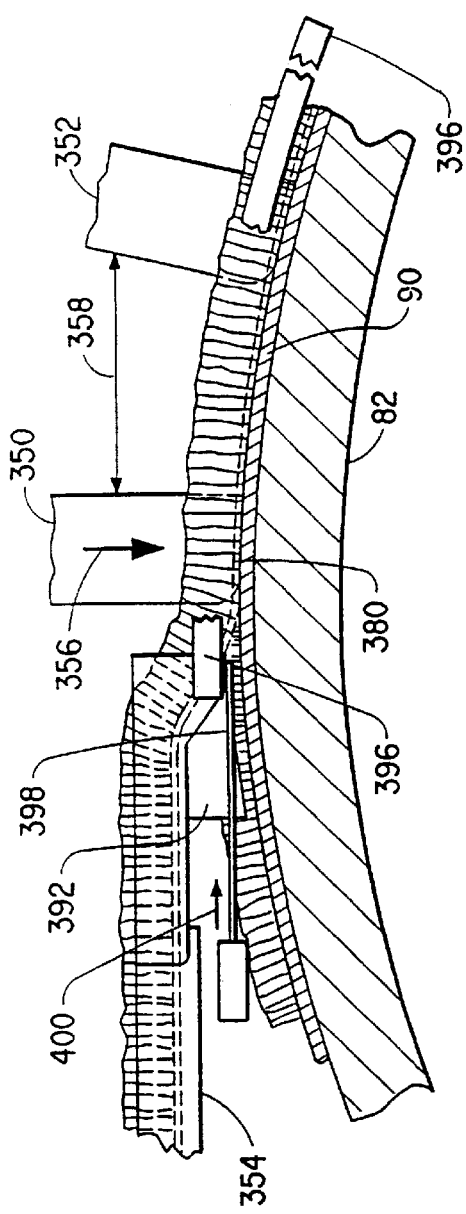
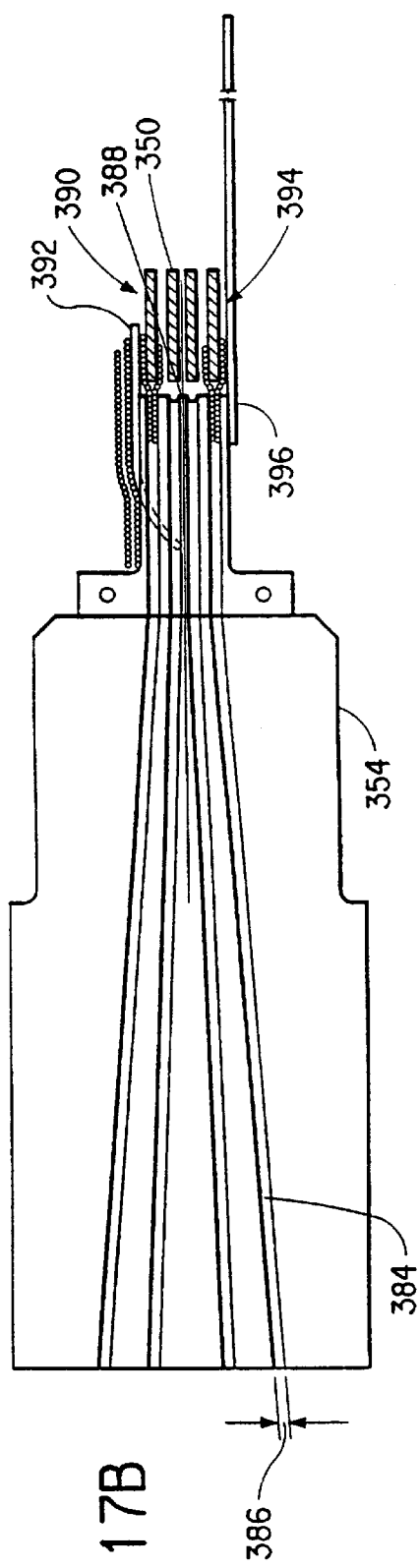
FIG. 17A
FIG. 17B

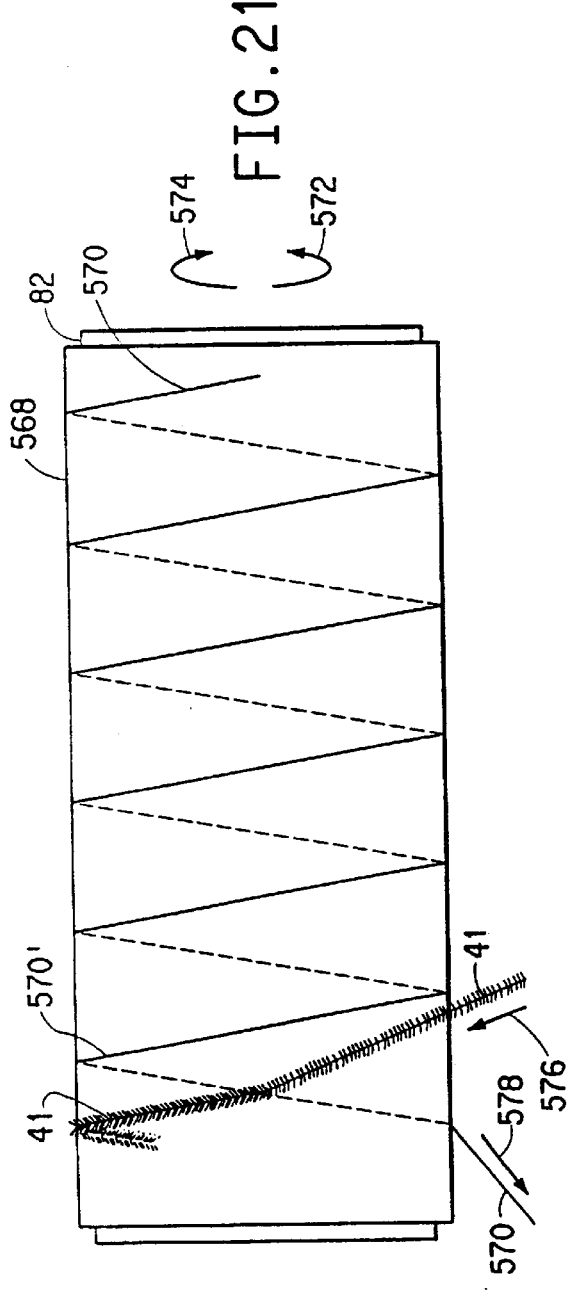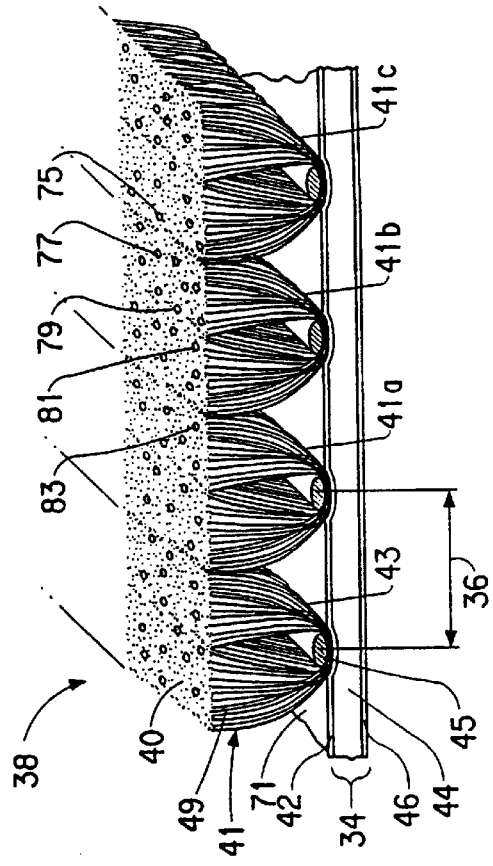

VELOUR-LIKE PILE ARTICLES AND PILE SURFACE STRUCTURES AND METHODS OF MAKING

CROSS-REFERENCE TO RELATED APPLICATION

This application claims the benefit of priority to Provisional Application 60/067,566, filed Dec. 5, 1997.

BACKGROUND OF THE INVENTION

1. Field of the Invention

The invention is related to a carpet mat and a moldable automotive carpet.

2. Description of the Prior Art

Molded automotive carpets and mats are typically made using tufted structures where the pile yarn is tufted into a planar spunbonded sheet, the tufts secured to the sheet, and the sheet then attached to a sound deadening backing to form a planar carpet. In the tufting process a significant amount of costly pile yarn is on the side of the spunbonded sheet that attaches to the backing. With very short pile heights the pile yarn wastefully buried in the backing makes up a large percentage of the pile yarn used.

To shape the carpet it is placed between platens in a press. The platen contacting the backing is heated to permanently secure the carpet to the backing. The carpet may also be molded and formed to the desired shape in the press. If it is desired to mold and shape the carpet the backing must be deformable.

The pile yarn is typically a "singles" (versus two or more yarns ply-twisted) bulked continuous filament ("BCF") yarn with relatively straight filaments that is cut to give a velour appearance. Such a carpet requires a separate tufted sheet formation step and a laminating step to join it to a backing. During molding to a shape there is sometimes a problem of separation of the rows of tufts during severe deformation required in some molds. This can be compensated by adding more rows of tufts to the entire tufted sheet, but this results in a higher cost carpet.

There is a need to simplify this process to reduce pile yarn waste and reduce costs without sacrificing quality.

Tuftstrings and tuftstring carpets are disclosed in U.S. Pat. No. 5,547,732 (Edwards et al.), but the preferred embodiments there shown are intended for residential use on flat floors and are not adapted to reheating and forming. This patent does not teach use of a heavy sound deadening backing nor variation of tuft spacing that accommodates stretching during forming. It discloses an elongated pile article or "tuftstring" made using yarn comprising filaments attached to a support strand. In a preferred embodiment, the yarn is a ply-twisted bundle of filaments suitable for use in a cut pile residential carpet having a 38.1 mm (½ inch) pile height. This preferred pile yarn does not produce the velour look preferred for automotive carpets or mats. In one described embodiment of this patent the individual yarns remain plied together when cut so the pile provides tuft definition at the top surface of the carpet after assembly of the tuftstrings into a carpet. If the pile yarn along the length of the strand is examined the individual pile yarns can be identified and there is little or no entanglement between individual pile yarns along the length of the strand. All of the filaments in the pile yarns are also biased upward since they are bonded while bent over a ridge on a mandrel and the filaments are preferably all entangled or ply twisted together into a bundle. Such a preferred configuration of pile yarn is useful when arranged in a final carpet structure, but it can be a problem when storing tuftstring in a wound package before assembly into a carpet, and when handling tuftstring at high speed during assembly into a carpet.

With the preferred tuftstring of the Edwards et al. patent, when trying to get all the filaments to lie in a ribbon-like plane for winding, it is difficult to get the individual pile yarns aligned in the same direction without some yarns crossing the strand either over the top or bottom of the strand. The individual yarns can act independently with some yarns going one way and other yarns another. This is a particular problem if the chosen strand does not have any significant torsional stability. The upward configuration of all the filaments in the pile yarns also contributes to difficulties getting all the individual pile yarns bent into a flat ribbon for efficient winding. When guiding the preferred tuftstrings for assembly into a carpet the above problems associated with individual pile yarns acting independently makes guiding difficult, especially with a strand that has low torsional stability. Special guides are disclosed for handling tuftstrings described in Edwards et al. in the carpet-making process disclosed in related publications WO96/06685 (Popper et al.) and WO97/06003 (Agreen et al.) (now U.S. Pat. No. 5,804,008. U.S. Pat. No. 5,804,008 is hereby incorporated herein by reference.

It is important that all pile yarn be oriented upright in the carpet assembly. If the tuftstring flips over due to torsional instability, and it is bonded to a backing in that orientation, the carpet assembly will be rejected.

The Popper et al. publication also teaches a process for making moisture stable tuftstring carpets using ultrasonic energy for bonding the tuftstrings to a backing substrate. A preferred nylon carpet construction uses a nylon tuftstring having the nylon ply-twisted tufts of the Edwards et al. patent attached to a nylon covered strand which has a fiberglass core. This tuftstring is bonded to a backing substrate comprising a fiberglass scrim placed between two layers of non-bonded, nonwoven nylon sheet to make a moisture stable carpet. Such a backing is lightweight and flexible and is designed to be the final backing for a residential carpet. The pile yarn lacks the desired look for an automotive carpet and the backing is costly to use as an intermediate backing for an automotive carpet construction that requires a layer of heavy sound absorbing material for the backing. The glass scrim in the backing and the glass in the strand would make the carpet inelastic so stretching and drawing would not be possible.

SUMMARY OF THE INVENTION

The present invention is directed toward a pile article (tuftstring) structure suitable for automotive pile surface structures (carpet, mat or door panel) that is easy to guide for carpet forming and it is easy to form into a flat ribbon-like configuration suitable for winding into a package. The tuftstring has a pile yarn comprising BCF singles yarn, that is not twisted, ply-twisted, or otherwise entangled to form individual tufts, and that is cut to a pile height of less than 12.7 mm (½ inch) and preferably less than 6.4 mm (¼ inch). The strand can be a torsionally stable one with an uninterrupted outer surface, or one with a glass core with a wrapped staple yarn sheath that has little torsional stability. The tuftstring so made surprisingly has a beneficial geometry for high speed handling and flat winding. The filaments in the yarn are distributed along the length of the strand in a monolithic loosely entangled array of filaments extending outward from the strand in two spaced apart pile rows which provide some torsional stability to the tuftstring structure. By torsional stability is meant that a 38.1 mm (1½ inch) length can be twisted one hundred eighty (180) degrees about the axis of the strand and the pile yarn will still retain a monolithic structure without the filaments separating, and the tuftstring will return to near the original configuration unaided and without evidence that it has been twisted.

The distribution of the filaments about the strand has a surprising configuration. Looking at the cross-section of the tuftstring there are filaments along a lower side of each row that lie within ten (10) degrees to a plane defined at the base of the tuftstring. The remaining filaments for each row are continuously distributed through an angular sector, having an origin in the base plane aligned with the width of the strand, that extends from the lower side of the row to an upper side that falls between forth five (45) and ninety (90) degrees from the base and leaves a space between the two rows that is at least equal to the width of the strand. This space between the rows is important for inserting a guide member that contacts the strand without trapping filaments between the guide member and the strand. The filaments at the lower side of the rows are in a position suitable for flat winding and they are entangled with the remaining filaments which is believed to facilitate flattening of the pile rows for flat winding. The entanglement of the upper side filaments with the lower side filaments also is believed to restrain the filaments at the upper side of the rows from coming together and closing the space over the strand that must be kept open for high speed guiding of the tuftstring. The filaments at the upper side of the rows are in a position suitable for forming a carpet pile surface when assembled with a backing substrate. The entanglement of the lower side filaments with the upper side filaments is believed to facilitate reorienting the lower side filaments upward during carpet formation.

The arrangement of filaments is especially useful in an automotive carpet mat when the strand used is comprised of a core of continuous glass filaments and at least one multifilament yarn wrapped at least partially around said core, although such a strand has low resistance to torsional twisting. The resulting tuftstring made with this strand is torsionally stable due to the arrangement of filaments in the pile structure. The glass in the tuftstring provides a level of moisture and thermal stability for a mat that must lay flat under gravity and is not draw molded.

The arrangement of filaments is especially useful in an automotive molded carpet when the strand comprises a support strand having an uninterrupted outer surface (which may include a monofilament or extruded sheath/core). Such a strand should also be permanently drawable free of fracture up to fifteen percent (15%) at a draw temperature of one hundred fifty (150) degrees C. and a draw force of 8.9 N (2 pounds) or less at said draw temperature, to thereby limit the draw force required for the tuftstring. With such a strand, the force required to draw the tuftstring is kept at a low level at a desired draw temperature of one hundred thirty to one hundred eighty (130–180) degrees C. This limits distortion of the overall carpet structure during molding so lateral separation or bunching of adjacent tuftstrings can be uniformly constrained by the backing substrate and the backing substrate is not damaged.

The arrangement of filaments in the tuftstring is particularly useful when making a pile surface structure preform, such as a preform for an automotive mat or carpet, by guiding the tuftstring at high speed onto a rotating drum covered with a backing substrate and embedding the tuftstring into the surface of the backing substrate. During such operation, the filaments forming the spaced monolithic pile rows provide resistance to torsional twisting of the tuftstring to aid handling and guiding, and maintain an open space between rows for a pressing tool to engage the strand without trapping pile row filaments between the strand and the tool or between the base of the tuftstring and the backing substrate. The surface of the backing substrate where the tuftstring is embedded may be tacky or may be caused to be tacky by the application of heat, for instance.

A variety of backing substrates are useful with the tuftstrings for making the automotive mat or moldable carpet preforms. The preforms typically are subsequently processed under heat and pressure between press platens to form the finished mat or molded carpet. In one embodiment a fabric layer is added to the backing before molding to stabilize the structure during and after molding. Any time after the tuftstrings are attached to the backing substrate, the bulkable pile yarn is treated with heat, or heat and moisture, to bulk the pile yarn and eliminate the spacing between pile rows so a uniform pile surface is formed in the finished product.

BRIEF DESCRIPTION OF THE FIGURES

The invention will be more fully understood from the following detailed description, taken in connection with the accompanying drawings, which form a part of this application and in which:

FIGS. 2A, 2B, and 2C show a tuftstring; useful in an automotive carpet of the present invention; while FIG. 2D is an enlarged diagrammatic view showing the geometric relationship of various features of the tuftstring illustrated in FIG. 2A;

FIG. 4 shows an isometric view of part of a molded automotive carpet structure;

FIG. 5 shows an isometric view of a tuftstring forming device shown making one tuftstring;

FIGS. 14A, 14B, and 14C are respective front, section, and side views of an ultrasonic horn useful with the mandrel of FIG. 12;

FIGS. 17A and 17B show an elevation and a plan view, respectively, of a guide to direct multiple tuftstrings for bonding from the top side of the backing;

FIG. 21 is a schematic side view of the cylinder of FIG. 6 showing an alternate way to retain the backing on the cylinder;

FIG. 22 is an alternate embodiment of the tuftstring carpet of FIG. 3;

DETAILED DESCRIPTION

Figure 1:
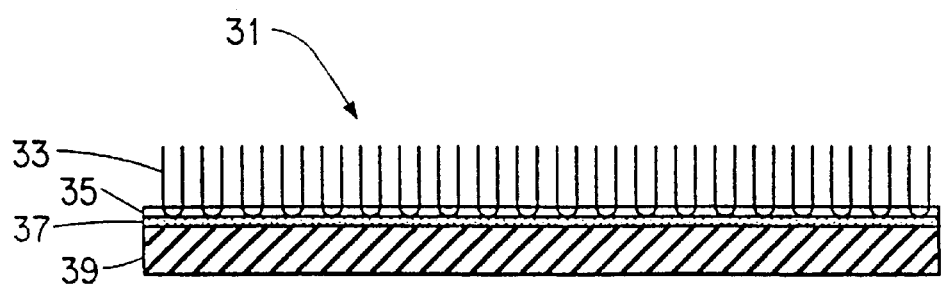
FIG. 1 shows an automotive carpet known in the prior art.

Throughout the following detailed description, similar reference numerals refer to similar elements in all figures of the drawings.

FIG. 1 shows a prior art tufted carpet structure 31 useful for a mat or for shaping in a mold for automotive use. The carpet structure 31 comprises tuft yarn 33 tufted into a primary backing 35 of a spunbonded polyester which is spray coated with an adhesive layer 37 of ethylene vinyl acetate hot melt resin sold under the trademark Elvax®, available from E. I. du Pont de Nemours and Company, Wilmington, Delaware ("DuPont"). It further comprises an extrusion coated layer 39 of a filled thermoplastic ethylene polymer sold under the trademark Keldax®, also available made by the E. I. du Pont de Nemours and Company. The layer 39 functions as a carpet protective layer and sound barrier. The tufting process requires a large creel of yarn during fabrication, and places a significant amount of yarn 33 on the back of the primary backing 35 as the tufting needles move and carry yarn from one row of tufts to another. The use of a primary backing 35, the step of tufting, and the waste of yarn on the back of the primary backing adds cost to the mat or molded carpet. These costs may be eliminated or reduced by making a mat or molded carpet using a tuftstring adapted for such purpose and using a new process for forming an automotive carpet.

FIG. 2A shows an elongated pile article, or tuftstring, 41 useful in the invention. It comprises an elongated support strand 45 having a thermoplastic outer surface 47 and having a width 69 and a height 613. A plurality of thermoplastic bulkable continuous filaments, such as filament 49, are bonded to one circumferential region 608 of the strand surface 47 that extends along the length of the strand 45. The region 608 defines a strand base 610. The filaments, such as filament 49, form an elongated loosely entangled array of filaments 614 extending outward from the strand in two pile rows 616 and 618 spaced apart by space 617 extending from the strand 45 to the cut ends 619. The rows are connected together by continuous common filaments at a row base region 620. The base region of filaments 620 has a dense portion of filaments 622 bonded together to each other and secured to the surface 47 of the support strand at the strand base 610. The filaments in each row 616 and 618 have a pile length 624, measured from the strand 45 to 35 the cut ends 619, of between 2.5 mm (0.1 inches) and 12.7 mm (0.5 inches).

The circumferential region 608 along the length of the strand 45 defines an imaginary base plane 626 for the tuftstring. The pile filaments for row 616 along a lower side 628 adjacent the base plane 626 define an imaginary lower filament plane 630 for row 616. This filament plane 630 is at an angle 632 to the base plane 626. The angle 632 has an origin 634 in the base plane which is aligned with the width 69 of the strand at strand side 636. The angle 632 is preferably within plus or minus 10 degrees of the base plane 626 and is most preferably about zero (0) degrees, or substantially aligned with the base plane. The filaments at the opposed upper side 638 of row 616 defines an imaginary upper filament plane 640 for row 616 that is at an angle 642 to the base plane 626 with the origin at 634. The angle 642 is preferably 45–90 degrees, to thereby contain the filaments in the row 616 in an entangled array that keeps most filaments out of space 617 so strand 45 is freely accessible between rows 616 and 618.

The pile filaments for row 618 along a lower side 644 adjacent the base plane 626 define an imaginary lower filament plane 646 for row 618. This filament plane 646 is also at an angle 648 to the base plane 626. The angle 648 has an origin 650 in the base plane which is aligned with the width 69 of the strand at strand side 652. The angle 648, like angle 632, is preferably within plus or minus ten (+/−10) degrees of the base plane 626 and is preferably the same as angle 632 and is most preferably about zero (0) degrees, or substantially aligned with the base plane. The filaments at the opposed upper side 654 of row 618 defines an imaginary upper filament plane 656 for row 618 that is at an angle 658 to the base plane 626 with the origin at 650. The angle 658, like angle 642, is preferably the same as angle 642 at forty-five to ninety (45–90) degrees, to thereby contain the filaments in row 118 in an entangled array that keeps most filaments out of space 119 so strand 47 is freely accessible between rows 616 and 618. However, the angles 632 and 642 for row 616 do not necessarily have to be the same as angles 648 and 658 respectively for row 618.

Figure 2B:
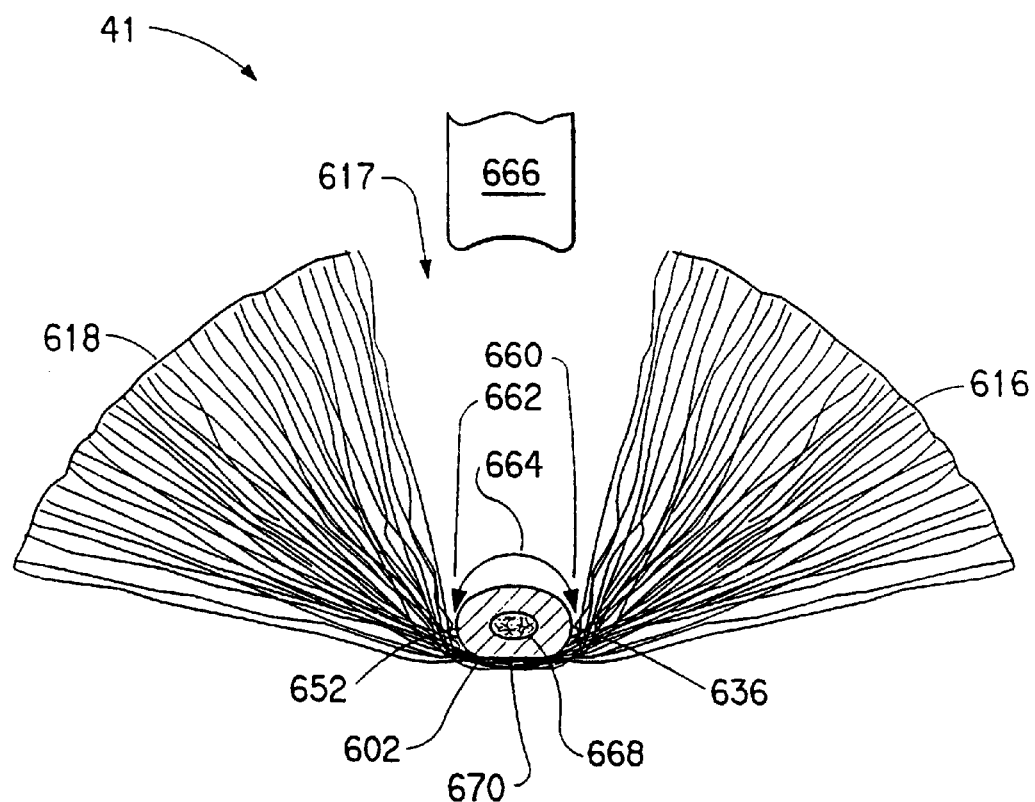

As best seen in FIG. 2B the tuftstring 41 has a guide groove 660 adjacent side 636 of the strand 45 and guide groove 662 adjacent the opposed side 652 of the strand 45. The grooves 660 and 662 lie between the strand 45 and the corresponding pile rows 616 and 618 respectively thereby providing an elongated guide ridge 664 formed by the upper portion of the strand 45 which is accessible to a guide tool 666 that may be passed through space 617 between the spaced apart rows without having to first move filaments from either row out of the way. Preferably, the guide ridge formed by the strand has a height of between 0.13–0.76 mm (5–30 mils) measured from the base, and a width which is equal to or less than the distance between the pile rows at the base region. Preferably, the guide ridge formed by the strand has a width of between 0.13–0.76 mm (5–30 mils).

Figure 2C:
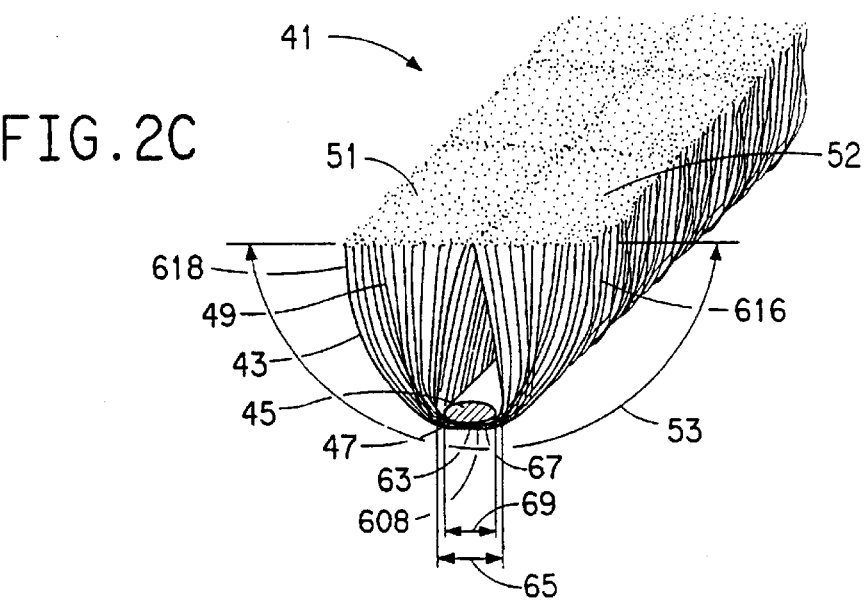

FIG. 2C shows a tuftstring similar to that of FIG. 2A where the pile rows 616 and 618 have been forced upward to form a pile surface having a velour-like look as would happen when the cut pile tuftstring is assembled into a carpet, which will be discussed later. The filaments in the rows are initially filaments of a plurality of yarns. Each yarn is bent over the elongated strand 45 and bonded to surface 47 at circumferential region 608 along the strand. The bent yarn forms a pair of tufts, such as tufts 51 and 52 of pile yarn 43 that form part of each row of filaments 616 and 618. The tufts are indicated for purpose of discussion by the shadow lines shown at the top of each tuft. A plurality of yarns forming pairs of tufts are assembled along the length of the strand to form the rows 616 and 618. The individual filaments, such as filament 49, are free to blend and loosely entangle with filaments of adjacent tufts where they come into contact along the length of the strand. The tuft identity indicated by the shadow lines may be visually absent within each row of filaments due to the blending and entanglement since adjacent tufts are typically identical. If adjacent tuft yarns were different colors, they could be distinguished after bonding and cutting, but when they are the same in all respects, they cannot easily be identified from the top of the tuftstring after bonding and cutting, or in a carpet made from assembled tuftstrings.

Figure 3A:
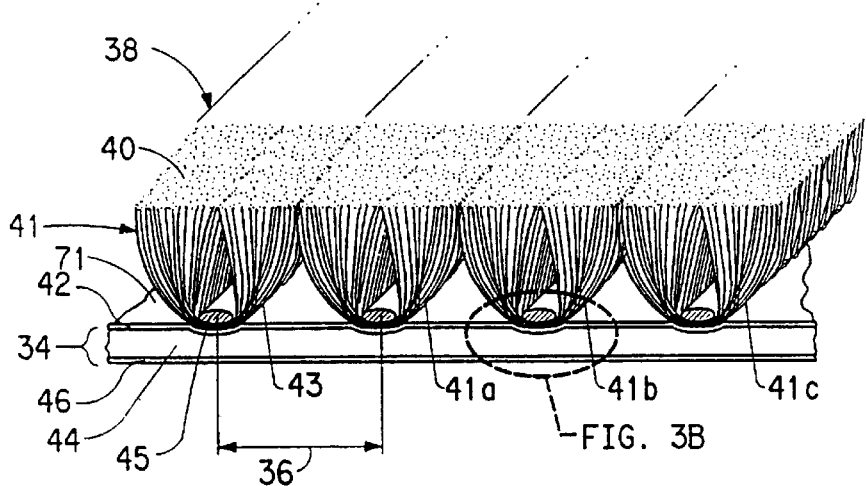
FIG. 3A shows an isometric view of one embodiment of a tuftstring automotive carpet structure.

FIG. 3A shows an assembly of tuftstrings, such as tuftstring 41, attached to a backing substrate 34. The tuftstrings 41 and 41a–c are spaced a selected distance apart, such as at 36, based on the desired density of tufts on the carpet, and are bonded along their length to the surface 71 of backing 34. The support strand 45 is bonded on the inside of the "U" shaped yarns, and the bottom side of the tuftstring, that is, the bottom of the bonded "U" shaped yarns, is bonded to the surface 71 of the backing. In the figure, the pile surface has a velour look due to the blending of the filaments along the length of a single tuftstring and from one tuftstring to the other, so that individual tuftstrings and individual tufts cannot be distinguished from the top pile side 40 of the carpet. In the embodiment shown the backing 34 comprises a laminate of an adhesive layer 42, a support layer 44, and a cover layer 46.

Figure 3B:
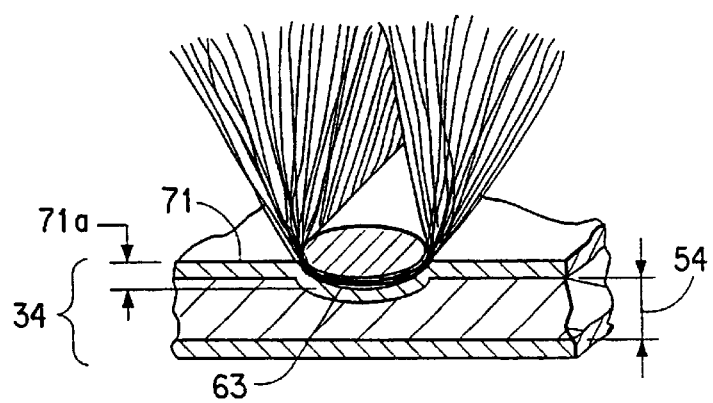
FIG. 3B shows a close up view of the attachment of the tuftstring to the backing.

FIG. 3B shows an enlarged view of the base of the tuftstring and how it is partially embedded in the backing 34. The bottom surface or base 63 of the tuftstring is below the top surface 71 of the backing 43 by a distance 71a. This embedding is important to ensure the top surface of the backing substrate, in this case adhesive layer 42, engages a large portion of the periphery of the tuftstring base 63 to securely attach it to the backing. The total thickness 54 of the backing substrate must be large enough that significant compression can occur during attachment to permit embedding of the tuftstring.

In a scouting test of the tuftstring carpet integrity, the carpet is restrained and a single tuftstring is grasped at one end and pulled until it separates from the backing. Three failure modes are typically observed. A first mode is that the interface where the tuftstring joins the backing fails. A second mode is that the interface remains intact and the backing substrate fails or delaminates. A third mode is that the interface remains intact and the dense region fails and the filaments in the dense region separate from each other with some remaining with the backing and some remaining with the tuftstring. A fourth mode is that one of the other modes exists briefly and then the strand breaks. It has been found that the first and second modes are preferred since they usually result in a higher force to failure. The third mode usually results in a low peel force failure. The fourth mode is rare.

To avoid the third mode of failure it has been found to be beneficial, for a given pile height, to place less yarn weight along the length of the tuftstring and place more tuftstrings per centimeter (inch) in the carpet structure to get the desired pile weight in the finished carpet. For a given pile length, this means fewer filaments per centimeter (inch) in the dense portion of the base region. This facilitates the bonding of the pile yarn to the strand so the dense portion of filaments at the base region does not easily pull apart, and the first or second modes of failure occur in the scouting test. When this is the case, the carpet has been found to stand up well to normal carpet endurance and wear testing, such as Vetterman drum testing. Following this reasoning, it is preferred to place 2.4–3.9 tuftstrings per centimeter (6–10 tuftstrings per inch) on the backing. This also results in a visually appealing carpet with uniform pile coverage and without rowiness.

In a preferred application the pile surface structure is used as a carpet in an automobile where it is molded to fit the single and compound curvatures of the floorpan of a car. FIG. 4 shows a portion of such a molded carpet 48 to illustrate some of the forming required. The carpet could be fabricated in a flat form or a pre-shaped form, heated, and placed in a mold to produce the three dimensional automotive carpet. To get from the two dimensional flat form to the three dimensional contoured form, the carpet must be drawn and in some cases compacted or microfolded as at compound curve 50.

To achieve the draw in the carpet structure 38 of FIG. 3A, the backing 34 must be able to stretch in all directions and the tuftstrings, such as 41, must be able to elongate. To achieve elongation of the tuftstrings, the strand 45 must be able to draw and permanently deform under heat and pressure without failure. The temperature used must be less than the deformation temperature of the pile yarn of the carpet so the pile is not damaged during molding.

A preferred drawable strand for a moldable carpet should not have too high a melt temperature compared to the backing, so the required molding stretch at a low force can be achieved. The draw force for the tuftstring, which is primarily the draw force of the tuftstring strand, must be low enough to not damage the backing substrate. A high strand stretch force, when molding over a compound convex surface produces a high resultant force lateral to the tuftstring that must be resisted by the backing to keep the tuftstrings from spreading apart. If the force is too high and the backing is not strong enough at the deformation temperature, the backing may thin out excessively and the tuftstrings may spread apart non-uniformly. In the worst case, the backing may tear and a hole open up in the carpet that is visible from the pile side. It is believed that a strand which will permanently draw fifteen percent (15%) at a temperature of one hundred fifty (150) degrees C. at a draw force for the strand of less than ten (10) pounds will not generate excessive draw forces when formed into a tuftstring, assembled into a carpet, and molded to make a three-dimensional contoured automotive tuftstring carpet.

The backing 34 in addition to being able to stretch in all directions when heated and pressed in the molding press, preferably provides a sound absorbing or noise damping function in use as an automobile carpet. A suitable such material is made by E. I. du Pont de Nemours and Company under the trademark Keldax®. This material is a filled thermoplastic ethylene polymer that has an elongation to break of 450% and a density of 1.9 g/cc for a medium density product or 2.2 g/cc for a high density product. [Keldax®, 6868 is EVA (ethylene vinyl acetate copolymer) with up to 70% Calcium Carbonate filler]. Keldax® polymer material can be joined with the tuftstrings as an extruded coating, an injection molded surface or laminated as a pre-formed sheet or film. As a film, the surface density may range from 1.5 to 4.4 kg/sq m (0.3 to 0.9 lb/sq ft) when the high density product is used. In a preferred embodiment, the Keldax® has a density of at least 1 g/cc and a thickness of at least 0.4 mm (15 mils).

To achieve good adhesion of the tuftstring, such as tuftstring 41 to the support layer 44, an adhesive layer 42 is required on the Keldax® polymer material. A preferred adhesive layer 42 for attaching a nylon pile yarn tuftstring to a Keldax® polymer material support layer is a 0.08 mm (3 mil) thick polyethylene film modified with maleic anhydride modified ethylene copolymer sold by E. I. du Pont de Nemours and Company under the trademark Bynel® CXA. (The preferred item is sold by DuPont as CXA 41E557.)

FIG. 5 shows a tuftstring forming module 55 and method for making a single elongated pile article, or "tuftstring", 41 by attaching pile yarn 43 to an elongated support strand 45. The strand 45 is guided along the edge, or ridge, 56 of a mandrel 58 and the yarn 43 is wrapped around the mandrel and strand by rotating eccentric guide 60. One or multiple yarns may be wrapped at once; two are shown at 43a and 43b. The yarn 43 is ultrasonically bonded to the strand 45 as it is pulled under an ultrasonic horn 62 by movement of strand 45 and other carriers 64 and 66. The wrapped yarn 43 is cut by a rotating blade 68 that intersects a mandrel slot 70 so the strand with bonded yarn attached can be removed from mandrel 58 and guided to further processing steps as at 72. The above-described process and the tuftstring product produced is discussed further in U.S. Pat. No. 5,547,732 (Edwards et al.), which is incorporated herein by reference.

Figure 6:
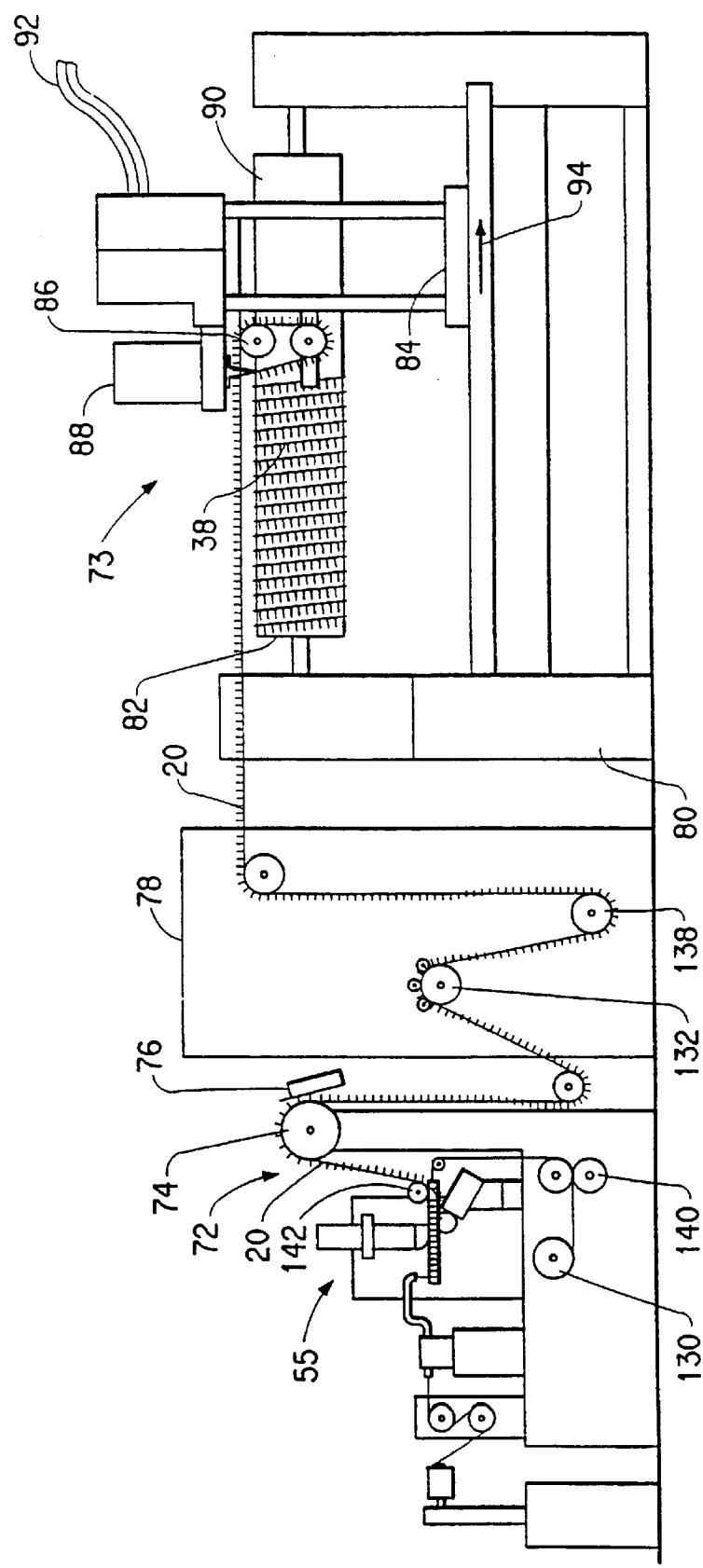
FIG. 6 shows an elevation view of a tuftstring carpet forming system.

FIG. 6 shows an apparatus for carrying out further processing steps on the tuftstring. The tuftstring forming module 55 of FIG. 5 is shown in the left of FIG. 6 and the further processing steps are shown beginning at position 72. The single tuftstring 41 passes over a slotted driven roll 74 where the tuftstring may have the pile height trimmed to a desired height of less than 12.7 mm (½ inch) by electric shears 76, and then proceeds to a forwarding and tensioning assembly 78. The tuftstring 41 proceeds to a carpet forming module 73 that comprises a lathe type device 80 on which is mounted a large cylinder 82 for winding the tuftstring onto a backing fabric in a spiral array. Mounted for travel along the guideways of the lathe device 80 is a carriage 84 that includes tensioning and guiding devices 86 and ultrasonic bonding devices 88 for attaching the tuftstring to a backing 90 held on the cylinder 82. Flexible lines shown at 92 are for directing electrical power, control signals, and compressed air to and from the moving carriage 88.

In FIG. 6, after the tuftstring 41 has been traversed the length of the cylinder 82 (from left to right in FIG. 6 in the direction of arrow 94) and bonded along the length of the tuftstring to the backing 90, a pile surface structure (tuftstring carpet assembly) 38 is produced on the cylinder. By slitting the carpet structure along the axis of the cylinder, the structure can be removed from the cylinder and laid flat like a conventional carpet. The carpet may be subject to additional treatments, such as dyeing and bulking, after removal from the cylinder, or some treatments may be accomplished before removal from the cylinder. For instance, it is possible to place a housing around a portion of the cylinder surrounding a section of bonded carpet and supply a heated fluid to the housing to bulk the carpet on-line.

The cylinder 82 of FIG. 6 is preferably covered is with a thermal insulative coating that slows the heat flow from the ultrasonically heated carpet elements to the cylinder. This is believed to make the ultrasonic heating more efficient. One such coating that has been found to work is a TFE-coated fiberglass made by the CHEMFAB company in Merrimack, N.H., designated Premium Series 350-6A. An acrylic adhesive may be used to attach the coating to the metal cylinder. The TFE surface keeps the backing substrate from sticking to the coating. The thickness of the coating may provide some resilience to the cylinder surface to reduce concentrations of force due to dimensional variations in the elements that may produce "hot spots" as the tuftstring is bonded to the backing. If a thicker backing structure is used that provides some load distribution during bonding, or if the speed of the tuftstring under the horn is greater than about 9.1 meters/min (10 yd/min) so significant heat transfer to the cylinder cannot occur in the time available, then such a coating may not be needed.

Other useful embodiments of the tuftstring and tuftstring carpet of the invention are possible. FIG. 22 shows one such embodiment where the tuftstring is made with a monofilament yarn blended in with the normal carpet pile yarn during production of the tuftstring as in FIG. 5. The monofilament yarn has a larger dtex (denier) than the filaments of the carpet yarn. The feed yarn 43 for the carpet pile could comprise two BCF pile yarns, comprising yarn 43a, and two strands of clear nylon 6 monofilament, comprising yarn 43b (FIG. 5). When cut and assembled on a backing, the cut ends of monofilament yarn show up as large diameter filaments, such as filaments 75, 77, 79, 81, and 83. These large cut filaments are much stiffer than the surrounding pile yarn filaments, such as filament 49. The stiffer filaments can act as a brush when a person's shoe is slid across the carpet as they are sitting in a car where the carpet is installed. This provides a useful new function of an efficient "doormat" where one can scrape off dirt from ones shoes when getting into of out of the car, and yet while still preserving the look of a fine automotive carpet. It would be expected that the stiffer filaments would also significantly extend the wear life of the automotive carpet. The stiffer filaments may also tend to keep dirt particles on the top surface of the carpet where they can be easily cleaned off, especially if the stiffer filaments are incorporated in an auto mat which can be easily removed from the car and shaken out.

The multifilament yarns 43 which are used as the pile, or tuft, yarns may be manufactured by various methods known in the art. These yarns contain filaments (fibers) prepared from synthetic thermoplastic polymers such as polyamides, polyesters, polyolefins, and acrylonitriles, and copolymers or blends thereof. Natural fibers such as wool may also be used. Preferably the polyamide (nylon) is selected from the group consisting of nylon 6,6 or nylon 6 homopolymer or copolymers thereof, sulfonated nylon 6,6 or nylon 6 copolymer containing units derived from an aromatic sulfonate or an alkali metal salt thereof, nylon 6,6 or nylon 6 copolymer containing units derived from 2-methyl-pentamethylenediamine (MPMD) and isophthalic acid, nylon 6,6 copolymer containing units derived from isophthalic acid and terephthalic acid, and nylon 6,6 copolymer containing units derived from N,N'-dibutylhexamethylenediamine and dodecanedioic acid. One preferred nylon 6,6 copolymer contains about 1.0 to about 4.0 weight percent of units derived from the sodium salt of 5-sulfoisophthalic acid.

Preferably, the polyolefin is polypropylene homopolymer or copolymers or blends thereof such as a propylene/ethylene copolymer blend.

Preferably the polyester is selected from the group consisting of poly(ethylene terephthalate), poly(trimethylene terephthalate), and poly(butylene terephthalate) and copolymers and blends thereof. Poly(trimethylene terephthalate) is especially preferred because it can be used to make fibers having good carpet texture retention and wear-resistance properties.

These polymers are used to prepare polymer melts or solutions which are extruded through spinnerets to form filaments by techniques known in the art such as those described in the above-referenced applications. The polymer melt or solution may contain additives such as UV stabilizers, deodorants, flame retardants, delustering agents, antimicrobial agents, and the like.

In some instances, the multifilament yarns containing these filaments are subsequently dyed to form colored tuft yarns. These yarns may be referred to as pre-dyed yarns since they are colored prior to manufacturing the carpet.

In other instances, a method known as solution-dyeing may be used to make colored filaments which are then used to make the multifilament colored tuft yarns. Generally, a solution-dyeing method involves incorporating pigments or dyes into the polymer melt or solution prior to extruding the blend through the spinneret. In a carpet context, these may also be referred to as pre-dyed yarns since the color is put in the yarn before the carpet is tufted or otherwise formed.

The pigment may be added in neat foam, as a mixture with the above additives, or as a concentrate wherein the pigment is dispersed in a polymer matrix. For color concentrates, one or more pigments are dispersed in a polymer matrix which also contains such additives as lubricants and delustering agents (TiO2). The color concentrate is then blended with the filament-forming polymer and the blend is spun into colored filaments. For example, U.S. Pat. No. 5,108,684, the disclosure of which is hereby incorporated by reference, involves a process where pigments are dispersed in a terpolymer of nylon 6/6,6/6,10 and pigmented pellets of the terpolymer are formed. These pellets are then remelted or "let-down" in an equal or greater amount of nylon 6, mixed thoroughly to form a uniform dispersion, resolidified, and pelletized. The resulting color concentrate is then blended with a nylon copolymer containing an aromatic sulfonate or an alkali metal salt thereof. The nylon melt-blend is then spun to form stain-resistant, colored nylon filaments.

Typically, in a nylon filament manufacturing process the molten polymer is extruded through the spinneret into a quench chimney where chilled air is blown against the newly formed hot filaments. The filament's cross-sectional shape is dependent upon the design of the spinneret. Preferably, the filament has a trilobal cross-section with a modification ratio (MR) of about 1.0 to about 4.0. The cross-section of the filaments influences the luster (glow of the filaments from reflected light), soil-hiding, bulk, and hand properties of the tuft yarns. The filament may contain voids extending through its axial core, as described in U.S. Pat. No. 3,745,061 or U.S. Pat. No. 5,230,957. The presence of voids in the filaments influences the luster and soil-hiding properties of the tuft yarns.

The filaments are pulled through the quench zone by means of feed rolls and treated with a spin-draw finish from a finish applicator. The filaments are then passed over heated draw rolls. Subsequently, the filaments may be crimped to make bulked continuous filament (BCF) yarns. These yarns have randomly spaced three-dimensional curvilinear crimp. Alternatively, the filaments may be crimped and cut into short lengths to make staple fiber. Hot air jet-bulking methods, as described in U.S. Pat. No. 3,186,155 or U.S. Pat. No. 3,525,134, may be employed to crimp and bulk the yarn.

Generally, for purposes of this invention, each yarn has a bulk crimp elongation (BCE) of about 20% to 50%, and a dtex per filament (denier per filament (dpf)) of about 17.6 to 27.5 (16 to 25). For entangled filament, loop-pile tuftstring carpets with good bulk, the BCE % may be toward the higher end of the above-mentioned BCE % range. For ply-twisted, cut-pile tuftstring carpets with good hand, the BCE % should be in a range of 27% to 49%, preferably 31% to 43%. For velour, cut-pile carpets with good resistance to felting, the BCE % may be toward the lower end of the above-mentioned BCE % range.

In the final carpet assembly, the tufts may have various forms such as, for example, loop-pile or cut-pile. Loop-pile tufts are characterized by having the yarn in the form of an uncut loop as described in U.S. Pat. No. 5,470,629, the disclosure of which is hereby incorporated by reference. The yarn in the present case, however, would be a straight yarn that has not been ply-twisted. Cut-pile tufts may be obtained by cutting the loops of the tuft yarns or preferably by the process shown in FIG. 5.

The final tuftstring carpet assembly may also be treated with stain-resist agents which provide resistance to staining of pile yarn by acid dyes. These stain-resist agents include, for example, sulfonated phenol- or naphthol-formaldehyde condensate products and hydrolyzed vinyl aromatic maleic anhydride polymers as described in U.S. Pat. No. 4,925,707. The tuftstring carpet assembly may also be treated with soil-resist agents which provide resistance to soiling of the pile yarn. These soil-resist agents include, for example, fluorochemical compositions as described in U.S. Pat. No. 5,153,046.

Preferably, the tuft, or pile, yarn contains filaments made from a polymer that can be fusion bonded to the selected polymer of the strand by thermal fusion or solvent fusion or the like, whereby the original polymer used for the strand and tuft provide the means for joining the strand and tuft, and the addition of a separate adhesive material is not required. However, the addition of a small quantity of adhesive material to enhance fusion bonding may be desirable. The tuft polymer and the strand polymer may be the same polymer or of the same polymer family. Preferably, the melt point of the strand polymer is less than the melt point of the pile yarn to minimize damage to the pile yarn filaments during bonding.

As described above referring to FIG. 3A, the inner surface of the backing substrate may be coated with a polyethylene or polypropylene adhesive film in order to improve the adhesion between the tuftstrings and the backing substrate. The film has a melting point greater than one hundred (100) degrees C. and less than the melting point of the multifilament nylon pile yarn. The film may be made by extruding a resin through a slot die onto a chilled roll. The resin solidifies to form a free-standing film which may be wound onto a core and stored for future use. Alternatively, the resin may be extruded directly onto the backing substrate to form the film. It is preferable that the thickness of the film on the backing substrate be in the range of about 0.08 mm to 0.13 mm (3 mil to 5 mil).

The polyethylene or polypropylene composition comprising the resin may be formed from a copolymer of ethylene or a copolymer of propylene with at least one of a C3–C10 hydrocarbon alpha-olefin, vinyl acetate, alkyl acrylate, or alkyl methacrylate that has been grafted with a monomer selected from ethylenically unsaturated dicarboxylic acids and anhydrides thereof. Examples of the hydrocarbon alpha-olefins include butene-1, hexene-1 and octene-1. Examples of the alkyl groups of the meth(acrylates) include methyl, ethyl, propyl and butyl. The grafting monomer is at least one monomer selected from ethyleneically unsaturated carboxylic acids and ethylenically unsaturated carboxylic acid anhydrides. Examples of the acids and anhydrides are acrylic acid, methacrylic acid, maleic acid, fumaric acid, itaconic acid, crotonic acid, itaconic anhydride, methyl nadic anhydride, maleic anhydride, and substituted maleic anhydride. It is preferable that the grafted maleic anhydride polymer composition be used for purposes of this invention. Commercially available examples of such ethylene copolymers and propylene copolymers include "Fusabond" adhesive resins available from DuPont Canada, Inc. and are described in U.K. Patent Specification 2,284,152. It is preferable that composition of ethylene copolymer grafted with maleic anhydride be used for purposes of this invention.

To form the adhesive resin these grafted polymer compositions may be used by themselves in concentrate form or they may be blended with non-grafted polymers. Particularly, these grafted polymer compositions may be blended with non-grafted polymers such as medium density polyethylene (MDPE), low density polyethylene (LDPE), linear low density polyethylene (LLDPE), very low density polyethylene (VLDPE), and polypropylene and blends thereof to modify such properties as the melting point, viscosity, and maleic anhydride content of the resin. Commercially available examples of such ethylene copolymer blends and propylene copolymer blends include "Bynel" adhesive resins available from DuPont (Wilmington, Delaware). It is preferable that ethylene copolymer blends be used for purposes of this invention.

If the grafted polymer composition is used by itself in concentrate form as the adhesive resin, then the resin should have a melting point greater than about 100 C. and in the range of about 100 to 130 C. for polyethylene-based compositions and about 130 to 170 C. for polypropylene-based compositions or ethylene/propylene-based compositions. In addition, the melt index of such a concentrate resin should be in the range of about 0.5 to 30 dg/minute at one hundred ninety (190) degrees C. and the maleic anhydride content of the resin should be in the range of about 0.01 to 5.00% by weight of resin. These melting point and melt index ranges provide a film having good stability in the carpet structure. The carpet may be subsequently bulked and the finished carpet may be steam cleaned without backing delamination problems.

If the grafted polymer composition is blended with a non-grafted polymer such as those described above, (MDPE), (LDPE), (LLDPE), (VLDPE), or polypropylene, or blends thereof to form the resin, then the blended resin should have a melting point greater than about 100 C. and in the range of about one hundred (100) to one hundred thirty (130) degrees C. for polyethylene-based compositions and one hundred thirty (130) to one hundred seventy (170) degrees C. for polypropylene-based compositions or ethylene/propylene-based compositions. In addition, the melt index of such a blended resin should be in the range of about 0.5 to 30 dg/minute at 190 C. and the maleic anhydride content of the resin should be in the range of about 0.05 to 1.00% by weight of resin.

It is also believed that the adhesive resins may be formed from unmodified polyethylene polymer or polyethylene polymer or copolymers and blends thereof provided that the resin has a melting point greater than 100 C. and less than the melting point of the nylon pile yarn. If the backing substrate is coated with a polyethylene film then the tuftstrings may be ultrasonically bonded to the backing substrate and the tuftstring carpet may be bulked at a temperature of one hundred twenty five(125) to one hundred eighty (180) degrees C. in a bulking method as described below.

There are a variety of strand configurations that are useful in the invention. One such strand is an extruded sheath/core structure where the core is a copolymer of polypropylene and the sheath is a copolymer of nylon. The core would comprise an 80/20 blend of polypropylene (Fina 3868) and grafted polypropylene (POXT1015) and the sheath would comprise nylon 6 and nylon 6,6 available as Capron® 1590 from E. I. du Pont de Nemours and Company. The weight ratio of polypropylene copolymer core to the nylon copolymer sheath would be 50/50.

For a preferred pile yarn of nylon 6-6, the strand 45 may be a monofilament of a copolymer of nylon 6/12 polymer melt-blended with 15% Novalac resin from Schenectady Chemical as HJR12700, and Capron® 1590 resin. The ratio of components is 60/20/20 by weight respectively. This provides a strand that will bond with the pile yarn polymer that has a lower melt point than the pile yarn polymer to thereby minimize pile filament damage.

Another such strand is a sheath/core strand having a nylon staple yarn sheath of nylon 6,6 copolymer containing 30% by weight of units derived from MPMD (2-methyl pentamethylene diamine) and a core of continuous polymeric filaments that can be stretched or continuous glass filaments for carpet mats that do not require forming and stretching. The strand wrapped with nylon staple yarn of nylon 6,6 copolymer containing thirty percent (30%) by weight of units derived from MPMD to be used as the sheath can be made by conventional means. For instance, a strand can be made by wrapping a single staple sliver of 38.1 mm (1.5 inch) staple length, 2.0 dtex/f (1.8 dpf) of the nylon yarn over a continuous multifilament glass core of 1595 dtex (1450 denier). The total dtex (denier) of the strand may be about 2970 (2700) with a glass-to-nylon area ratio of about 0.58. There would be good coverage of the glass and enough nylon polymer for good adhesion to the face yarn. Higher dtex (denier) strands with more staple fibers and a lower nylon/glass ratio would also work. The machine used for making this wrapped strand is the "DREF 3 Friction Spinning Machine" manufactured by Textilmachinenfabrik Dr. Ernst Fehrer A G of Linz, Austria. A similar machine is described in U.S. Pat. No. 4,779,410 (Fehrer).

The nylon staple yarn used for the strand sheath could also be a blend of staple filaments for special purposes. For instance, it may be desirable to make a blend of 5–25% by weight lower melting binder filaments (such as about 20% polypropylene filaments) with nylon 6,6/MPMD staple yarn, or unmodified nylon 6,6 staple yarn to produce a staple blend that is wrapped around the glass core. When ultrasonically bonded, the lower melting binder filaments may result in more cohesiveness for the strand in the axial direction and this may aid in resisting tuftstring damage during processing tensions, and resisting carpet damage due to installation and handling tensions and wear in use. Other possible blended staple filaments may include filaments having antistatic properties and such filaments could work with antistatic filaments in the tufts to reduce static buildup in the finished carpet.

Strands having other wrapped structures can also be used. For example, nylon bulked continuous filament (BCF) yarns may be wrapped around the continuous filament core using a rubber covering machine manufactured by OMM America located in Natick, Mass. For instance, two BCF yarns may be wrapped in opposite directions of rotation around a fiberglass core to achieve coverage of the core and a balanced twist structure. This wrapped strand would function similar to the nylon staple yarn wrapped strand, but the process would not have the same ease of blending in other polymer filaments for special functionalities.

The support strand may be comprised of a central core with a sheath. The core may be formed of a plurality of elongated filaments of fiberglass and filaments of staple yarn. The sheath may be a staple yarn wrapped about the core. The nylon staple yarn sheath of the strand may comprise nylon 6,6 filaments made from nylon 6,6 copolymer containing about 30% by weight of units derived from MPMD (2-methyl pentamethylene diamine). The staple strands of the core would be the same material as the sheath. The nylon staple yarn comprising nylon 6,6 filaments made from nylon 6,6 copolymer containing about 30% by weight of units derived from MPMD used as the sheath can be made by conventional means. The strand can be made by wrapping a staple sliver of 38.1 mm (1.5 inch) staple length, 2.0 dtex/f (1.8 dpf) of nylon yarn over a continuous core of multifilament glass of 1595 dtex (1450 denier) and a drafted staple strand which is coextensive with the fiberglass multifilaments. The total dtex (denier) of the strand may be about 2970 (2700). The core is preferably about 40–60% by weight of the strand. The staple filaments make up the remainder with preferably about 50–80% of the staple filaments being in the sheath. The filaments of staple yarn and the filaments of fiberglass extend in the same direction. The wrapped staple sheath filaments engage with the staple core filaments. This engagement is frictional before bonding and additionally becomes a fusion engagement during ultrasonic bonding of the pile yarn to the strand. This is important to prevent stripping-back of the wrapped staple yarn sheath (and attached pile yarn) along the core when the sheath surface (before bonding) or tufts (after bonding) meet resistance over rolls or guides in the handling of the strand and tuftstring in the carpet forming machines. It is believed that most of the sheath filaments become bonded together and some of them are bonded to the tuft filaments during the ultrasonic process for attaching the tufts. This is an improvement over the strand and tuftstring where the wrapped staple does not adhere as well to the glass fibers in the core where there is no coextensive staple core covering. A machine that can be used for making the wrapped strand is the "DREF 3 Friction Spinning Machine" manufactured by Textilmaschinenfabrik Dr. Ernst Fehrer AG of Linz, Austria.

As previously mentioned above, the nylon staple yarn could also be a blend of staple filaments for special purposes. Staple with a different dtex (denier) per filament may also be used, although it may be desirable to keep the dtex (denier) per filament of the staple less than or equal to the dtex (denier) per filament of the pile yarn so there is preferential melting of the staple strand filaments. In this vein, the staple filaments used in the core may be different from the staple (or the staple blend) filaments used in the sheath.

In using the staple wrapped strands mentioned above, there is sometimes a problem with uniformity of the staple sliver being used when slubs, or clumps of fibers, occur at random intervals along the length of the strand. These clumps can create problems in handling the strand and in proper bonding of the strand using ultrasonics. It is possible to decrease this sensitivity to slubs by using two smaller dtex (denier) wrapped strands, as made in the discussion above, and plying them together to make a single, elongated, ply-twisted yarn support structure. For instance, each strand may comprise a core formed of a plurality of elongated continuous thermoplastic or thermally stable filaments (fiberglass), and a sheath of staple yarn wrapped about the core. The core of each strand [of about nine hundred ninety (990) dtex (900 denier) each if fiberglass is used] would be wrapped with a staple sheath (to provide a total dtex (denier) for each strand of about 1650–2200 (1500–2000), and for a total dtex (denier) for the two-ply support structure of 3300–4400 (3000–4000)). The individual strands would be plied together at about 0.8–1.6 turns per centimeter (2–4 turns per inch) in a conventional manner such as on a commercial ring spinning machine made by Leesona Corp., Burlington, N.C. The plying also aids in preventing stripping-back of the sheath along the core.

Figure 7:
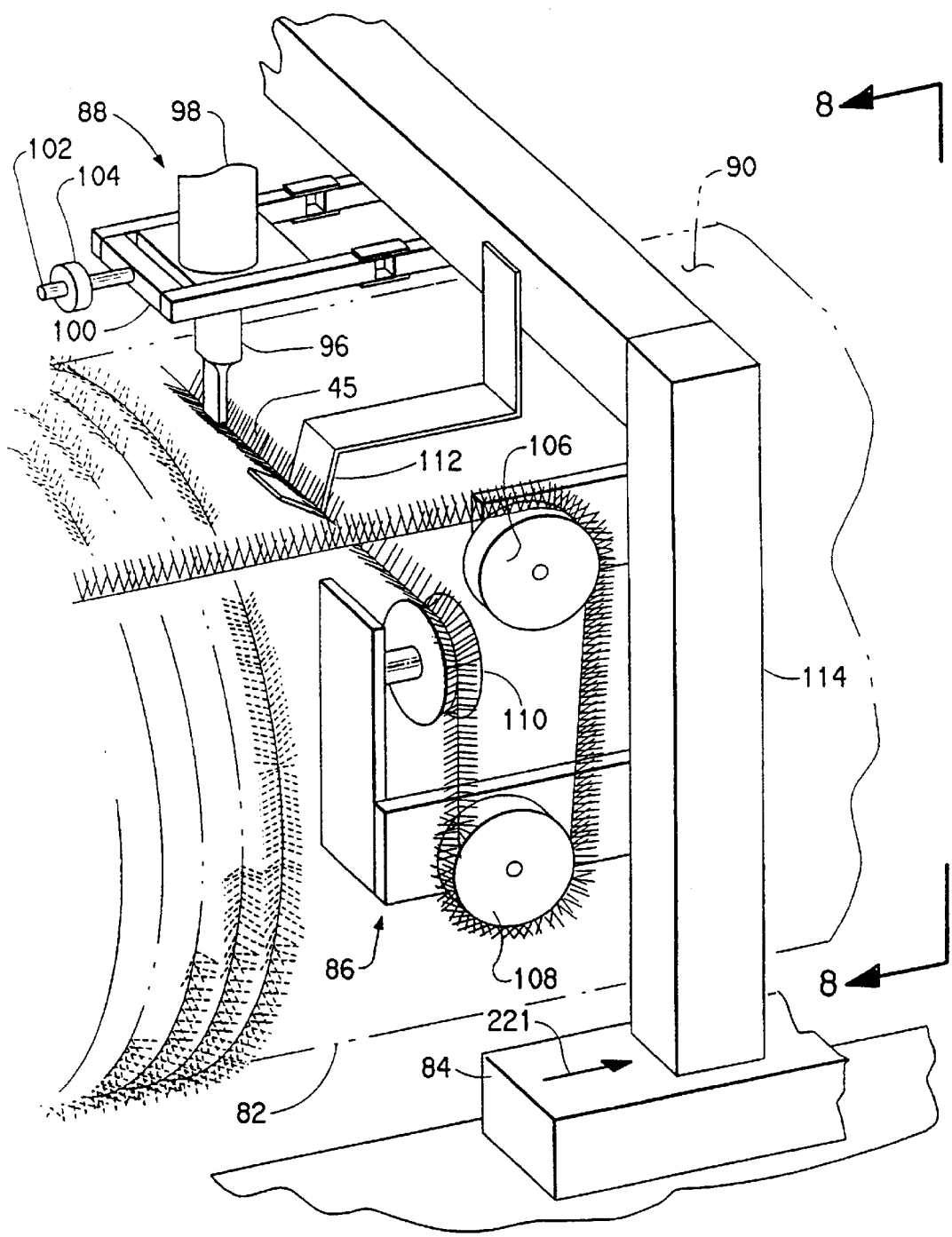
FIG. 7 shows an isometric view of a portion of the carpet forming system.

Referring once again to FIG. 6, it is important that the tuftstring be carefully guided onto the cylinder 82 and under the ultrasonic bonding device 88. FIG. 7 is a close-up view of a portion of FIG. 6 showing the tuftstring 45 as it is guided onto cylinder 82, covered with backing 90, by tensioning and guiding device 86. The ultrasonic bonding device 88 consists of at least one ultrasonic horn 96 and ultrasonic driver 98 attached to a flexible mount 100 that allows the horn and driver to move freely in a radial direction relative to the cylinder. An arm 102 on the mount 100 permits weights, such as weight 104, to be added to control the force the horn exerts on the tuftstring. The tensioning and guiding device consists of V-groove tensioning wheels 106 and 108, guide wheel 110, guide groove 112, and other guides better seen in FIGS. 8 and 9. The V-groove in wheels 106 and 108 keeps the tuftstring upright and grips it so a magnetic torque of the tensioning wheels can resist the pull of the tuftstring by the rotating cylinder, and thereby apply tension. The magnetic tensioning wheels can be obtained from Textrol, Inc., Monroe, N.C. The tuftstring twists 90 degrees between tensioning wheel 108 and guide wheel 110 which also has a V-groove. The tensioning and guiding device 86 and bonding device 88 are attached to frame member 114 that is attached to traveling carriage 84.

Figure 8:
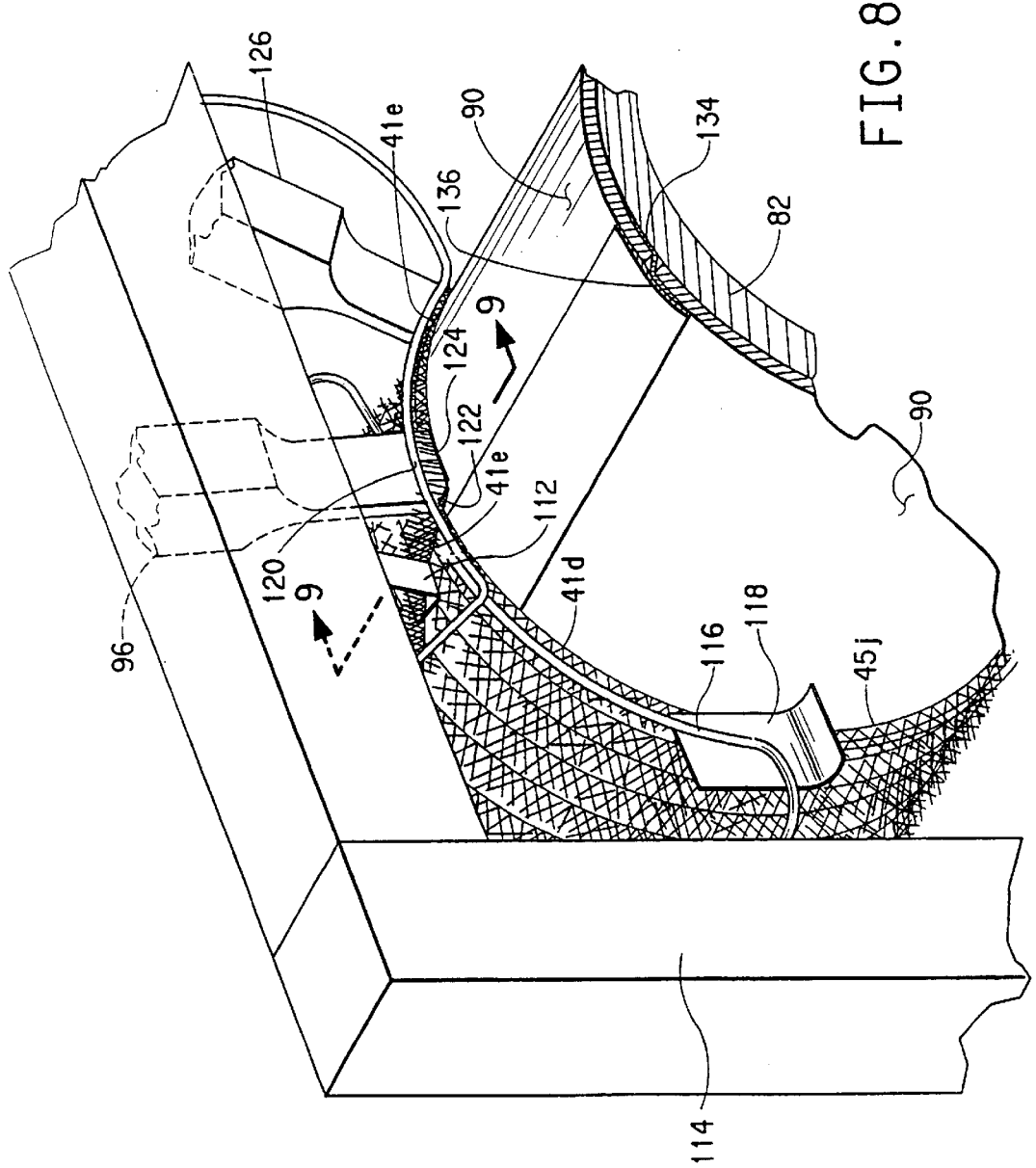
FIG. 8 shows an isometric view of another portion of the carpet forming system.

FIG. 8 is view 8—8 from FIG. 7 showing further details of how the tuftstring may be guided. It is important that the upstanding tufts of the adjacent tuftstring already on the cylinder do not get trapped under the incoming tuftstring being bonded to the backing on the cylinder. It is also important that the incoming tuftstring be positioned with the tufts upright and the strand directly under the ultrasonic horn. To accomplish these ends, in FIG. 8 a guide rod 116 is attached to frame member 114 and follows the contour of the cylinder close to the backing and presses sideways against the upstanding tufts of tuftstring 41*d* to hold them away from the incoming tuftstring 41*e* and ultrasonic horn 96. A guide plate 118 is attached to guide rod 116 and is placed close to the backing 90 and at an angle to the bonded tuftstring 41*e*. Another guide rod 120 is attached to frame member 114 and is placed close to the incoming tuftstring to keep the upstanding tufts upright and assist in guiding the incoming tuftstring 41e under the horn 96. In a preferred embodiment, guide 120 would extend far enough beyond the last ultrasonic horn for bonding the tuftstring, which may be ultrasonic horn 96, to keep the upstanding tufts upright until the bond for the tuftstring had cooled sufficiently that it would not move or tilt over after being released from the guide. If this incoming tuftstring 41*e*, which has outer tufts unsupported by tufts of an adjacent tuftstring, is released by the guide before cooling, it has been found that the outer tufts tend to lay over slightly during heating and as the bonded tuftstring cools so that in the final carpet assembly this row of tufts produces a visible "streak" different than adjacent rows, even after shearing of the tufts, so the carpet has a defect called rowiness.

Figure 9:
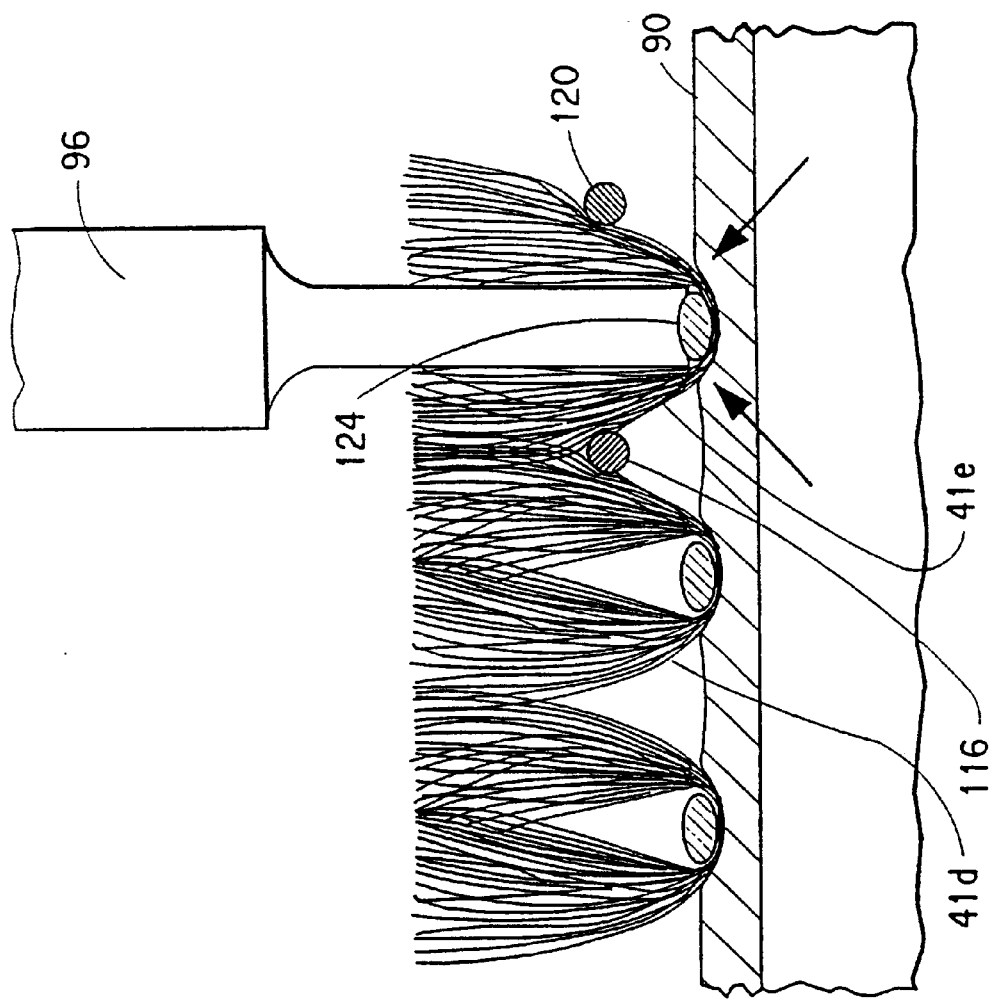
FIG. 9 shows an end view of a portion of a tuftstring carpet.

FIG. 9 shows another view 9—9 from FIG. 8 of guide rods 116 and 120 just in front of the horn 96. Guiding of tuftstrings 41d and 41e keeps the tufts from getting bent over and trapped under the horn 96 or between the tuftstring 41e and the backing 90 during bonding. To assist in alignment of the tuftstring under the horn, the leading edge 122 of the horn 96 (FIG. 8) is radiused and this edge and the bottom edge are contoured to receive the strand guide ridge 664 that comes in direct contact with the surface of the horn which acts as a guide tool. In the case of an elliptical strand surface (after bonding with the yarn), these horn edges would be a concave radiused surface which can be seen in FIG. 9 at bottom surface 124. During high energy vibration of the horn this contoured surface helps keep the strand from sliding out from under the horn. The pressure of the horn against the strand presses the tuftstring against the backing substrate to embed the tuftstring into the surface of the backing. The backing is thick enough and deformable enough that the tuftstring is embedded below the backing surface 0.13–0.63 mm (5–25 mils). In some cases, the backing surface is locally deformed upwardly adjacent the tuftstring to accomplishment the embodiment.

FIG. 8 also shows another ultrasonic horn 126 that is useful when assembling the tuftstring to the backing at high speeds, such as about 9.1–22.9 m/min (10–25 YPM) tuftstring speed, and when high bonding reliability is required. Horn 126 is located close to horn 96 so the tuftstring 41e is still hot from horn 96 when it is bonded by horn 126. In this way, the heating is partially cumulative and the total energy needs for bonding can be shared by two horns. This permits operating at high speeds which requires high bonding energy. At low speeds, second horn 126 is useful for "re-bonding" the tuftstring and improving bond reliability by bonding areas that may have been missed by horn 96. It may also be useful to use horn 96 just to accurately tack the tuftstring in place with low vibration and force, and use horn 126 to firmly attach the tuftstring with high energy and force without the problem of the tuftstring moving around under the horn before bonding. This two horn technique may also be useful for attaching pile yarns to the support strand, particularly at high speeds.

Bonding means other than ultrasonic bonding may be employed to attach the yarn to the strand and to attach the tuftstring to the backing. Such means may be solvent bonding or thermal bonding with, for instance, a hot bar; or some combination of solvent, conductive, and ultrasonic bonding. One means found to work well is to provide a tacky surface on the backing, such as can be found when uncured rubber is used as a backing. Some pressure should be applied to the tuftstring strand to embedit in the backing. It is possible that the bonding occurs without the separate addition of adhesive material to the tuftstring or backing when joining the tuftstring to the backing, however, it is preferred to include the addition of adhesive in the bonding area to achieve bonding between dissimilar thermoplastic polymers or to enhance ultrasonic bonding. Bonding using spaced apart areas aligned with the base surface of each tuftstring adhesive may also be achieved using methods described in above-referenced U.S. Pat. No. 5,547,732.

In operation of the device of FIGS. 5 and 6, yarn from source 128 and strand from roll 130 are fed to mandrel 58 where the strand travels along ridge 56 and to drive roll 132 in the forwarding and tensioning assembly 78. The yarn 52 is wrapped around the mandrel and strand and bonded to the strand by ultrasonic horn 62 to make tuftstring 51. The tuftstring is threaded through the apparatus to cylinder 82. Backing 90 is attached to cylinder 82 by tape 134 and is wrapped around the cylinder and cut to form a butt seam and taped to itself by tape 136 as shown in FIG. 8. The end of the tuftstring is threaded under the horn 96, and horn 126 if used, and taped to the backing at the far left of the cylinder 82 where the carriage 84 is positioned for startup. Rotation of the cylinder 82 can now be started and the ultrasonic horn energized to bond the tuftstring to the backing; the cylinder 82 acts as the ultrasonic anvil. Carriage 84 is geared to the cylinder rotation so it traverses the desired pitch, say about 5.1 mm (0.2 inch), for one revolution to advance the tuftstring along the cylinder and buildup a spiral array of tuftstring on the backing on the cylinder. When the carriage has traversed all the way to the right of the cylinder, the process is stopped and the carpet wound on the cylinder is cut along the tape seam for the backing and removed from the cylinder. The process can then be repeated. To control the speed and tension in the process, the speed of cylinder 82 can be constant and tuftstring drive roll 132 can vary slightly in speed to keep the tension monitored by a tensiometer 138 constant. The speed of a strand forwarding roll assembly 140 can also vary slightly in speed to keep the tension monitored by another tensiometer 142 constant.

Although the system shown in FIG. 6 for making the carpet winds only a single tuftstring, it is within the scope of the invention to wind multiple tuftstrings and provide an ultrasonic horn that has multiple blades closely spaced for bonding multiple tuftstrings simultaneously using a single ultrasonic energizer. A plurality of these multiple blade horns could be arranged along a cylinder so numerous tuftstrings could all be bonded at once and a complete carpet made rapidly with only a few complete revolutions of the cylinder.

Although the systems shown in FIG. 6 shows a batch process for making a carpet assembly, it is within the scope of the invention to make a continuous length of carpet by a warp process where there are enough tuftstrings fed to the cylinder for an entire carpet width, and the cylinder serves as an anvil and a transport roll in the process. The backing would only make a partial wrap around the cylinder sufficient to bond the plurality of tuftstrings using multiple ultrasonic horns. In the FIG. 6 embodiment where the tufts are facing outward from the cylinder, one horn may have a plurality of blades for bonding a plurality of tuftstrings at once. The tuftstrings may be supplied inline from a plurality of mandrels, or the tuftstrings may be made off-line and supplied from wound packages, rolls, piddle cans or beams.

The pile yarn may be nylon 6,6 yarn which was solution-dyed, and no drying process was necessary in making the assembly, as is required with latex assembled tufted carpets. The carpet pile yarn was not subject to complete heating during assembly and was therefore not bulked. The tuftstring carpet of this invention may be bulked after it has been assembled. This bulking provides the carpet with greater covering power. The pile yarn is further bulked by heating the pile of the tuftstring carpet. In one bulking operation, the tuftstring carpet is placed on a tenter frame and passed through an oven, where the pile yarn is heated with a rapidly flowing stream of hot air and then cooled. In the case of nylon 6,6 multifilament pile yarn, the air temperature may be in the range of about ninety to one hundred fifty (90–150) degrees C. which raises the temperature of the tuft filaments throughout the pile yarn to at least ninety (90) degrees C. For purposes of this invention it is preferred that the temperature be in the range of about one hundred twenty five to one hundred eighty (125–180) degrees C. In a batch process as in FIG. 6, the carpet may be bulked by passing the pile yarn under a cover supplied with hot air, or hot air and a water mist, or low temperature steam. As the drum rotates the cover would be traversed along the drum to successively treat all of the carpet surface.

The invention is also useful for making carpet structures which do not utilize ultrasonic energy to attach the tuftstring to the backing. For instance, the backing may be a conventional uncured rubber backing which is still tacky. The backing would have a release sheet on the drum side and the side where the tuftstring is attached would be uncovered. When using a tacky surface backing, the ultrasonic horn would not be energized and would just act as a pressing means and guide.

During ultrasonic bonding of the yarn to the strands and during ultrasonic bonding of the tuftstrings to the backing substrate, it is beneficial to direct a jet of cool air at the ultrasonic horns and ultrasonic drivers to keep the temperature consistent during startup and continuous operation; heat buildup can cause variability in the bond. Some heatup of the ultrasonic driver does occur during continuous operation which changes the efficiency of the unit. Changing the horn amplitude to maintain constant power corrects for this changing efficiency so stable bonds are produced. In order to start and stop the ultrasonic bonding process and produce acceptable product, the ultrasonic horn amplitude and horn pressure must be ramped up and down as the speed of the tuftstring ramps up and down. During steady state running, the tension on the yarn, support strand, and tuftstring must be monitored and controlled, and the ultrasonic power monitored and controlled to be constant.

Figure 10:
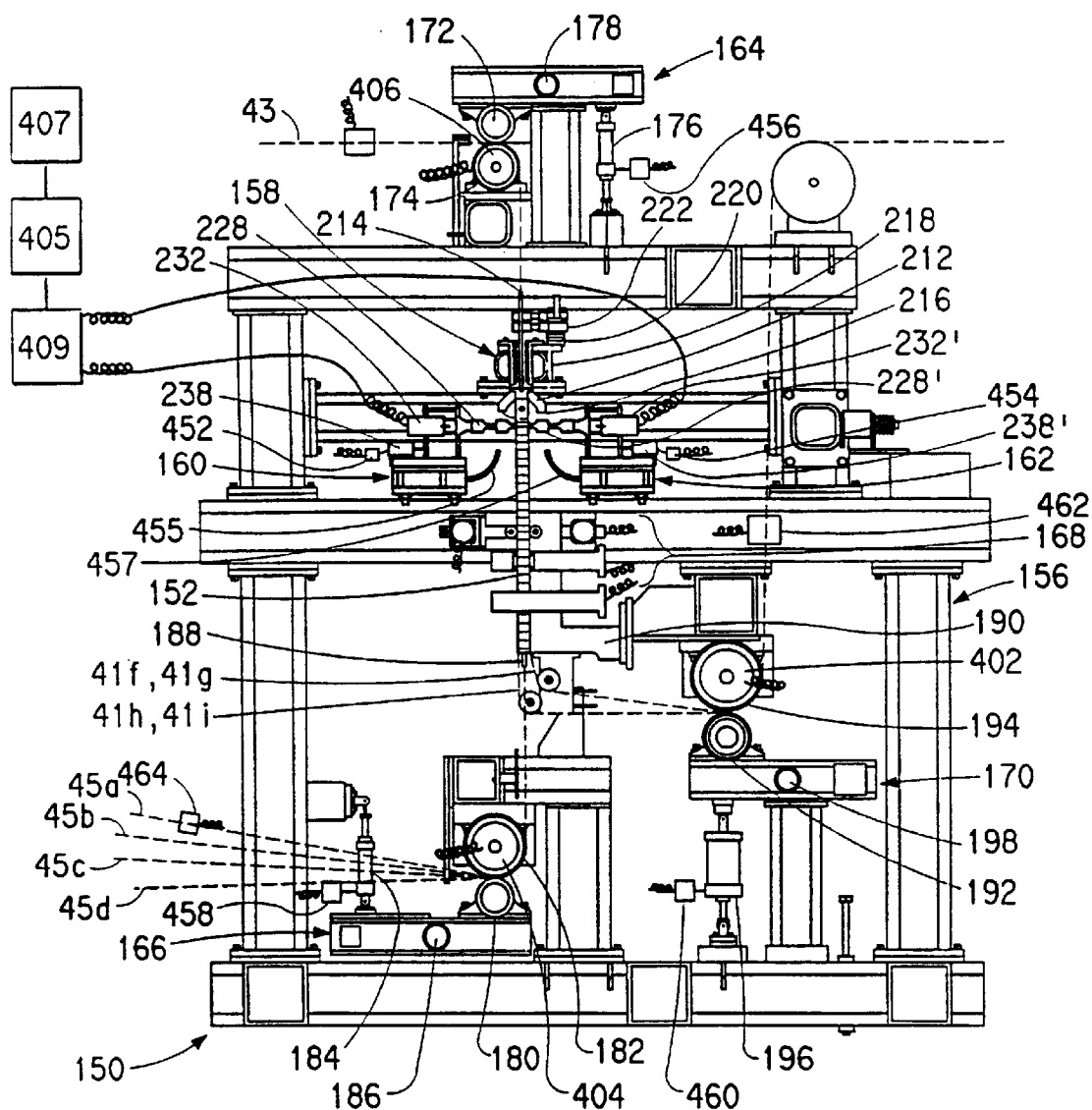
FIG. 10 shows an elevation view of another embodiment of a tuftstring forming device shown making four tuftstrings.

FIG. 10 shows an end view of a basic single mandrel tuftstring former 150 using a four tuftstring mandrel 152. This is an alternate embodiment where four tuftstrings are made at a time instead of only one as discussed regarding FIG. 5. Major elements of the tuftstring former 150 are the four-sided mandrel 152, a frame 156, a yarn wrapper 158, two ultrasonic bonding modules 160 and 162, a yarn feed module 164, a strand feed module 166, a cutter arrangement 168, and a tuftstring drive module 170. Yarn 43 is fed in through an idler feed roll 172 and driven feed roll 174 that are nipped together by fluid cylinder 176 acting around pivot 178 to grip the yarn 43 that may comprise one or several yarn ends for each mandrel. Strands 45a, 45b, 45c, and 45d are fed in through an idler feed roll 180 and driven feed roll 182 that are nipped together by fluid cylinder 184 acting around pivot 186 to grip the strands. Four strands are fed to the entrance end 188 of mandrel 152 where each strand is guided through a separate tube within a central hollow in the mandrel to keep the strands separated and prevent tangling. The mandrel is attached to frame 156 by bracket 190 on one side of the mandrel downstream from the cutter arrangement 168 that frees the wrapped yarn from the mandrel and forms four separate cut-pile tuftstrings. The tuftstrings 41f, 41g, 41h, and 41i are fed through an idler exit roll 192 and driven exit roll 194 that are nipped together by fluid cylinder 196 acting around pivot 198 to grip the tuftstrings. Driven roll 194 has grooves to hold the "U"-shaped tuftstrings and idler roll 192 has ribs fitting into the grooves with the tuftstring therebetween.

Figures 12, 13:
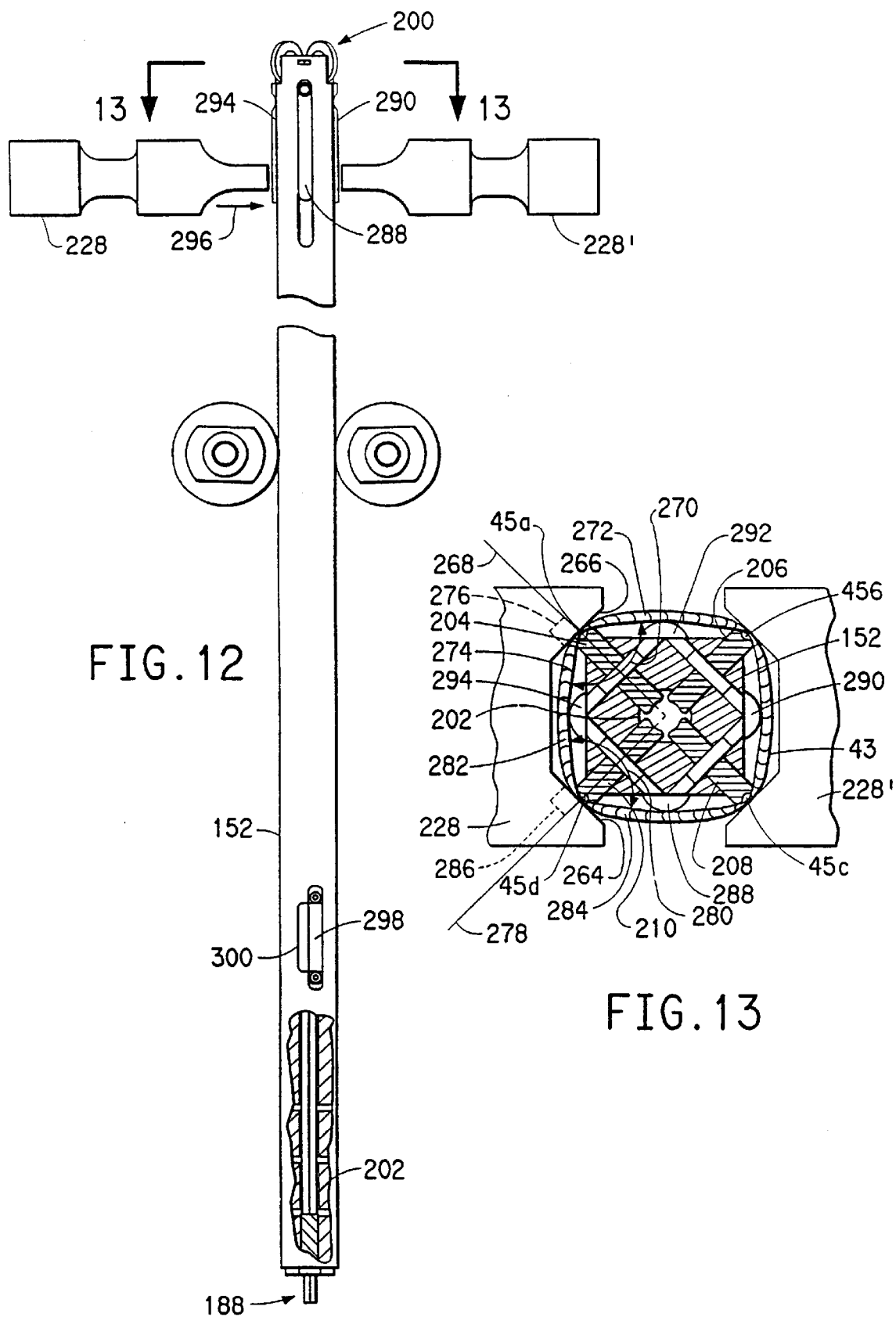
FIG. 12 is a view partially in section of a tuftstring forming mandrel.
FIG. 13 is an enlarged section view of the end of the mandrel taken along line 13—13 of FIG. 12.

FIG. 12 shows entrance end 188 of the mandrel 152 where the strands enter and exit end 200 where the strands exit. FIG. 13 is an enlarged section view of the exit end that shows a turning pulley for each strand that guides the strand from a hollow passage 202 in the center of the mandrel 152. Pulley 204 guides strand 45a, pulley 206 guides strand 45b, pulley 208 guides strand 45c, and pulley 210 guides strand 45d. The strands are guided from the passage 202 to grooves on the corners of the mandrel as discussed below.

The yarn is wrapped around the mandrel, and over the support strands in the grooves on the corners of the mandrel, by wrapper 158 that comprises a hollow spindle 212 with a yarn entrance end 214 and a yarn exit end 216. The spindle is rotationally held by a bearing assembly 218 attached to frame 156. The spindle is rotated by a motor 220 acting through a pulley and belt arrangement 222. As the yarn 43 wraps around the mandrel 152, the strands 45a, 45b, 45c, and 45d advance axially (downward) along the mandrel carrying the strands and yarn away from the wrapper and to the ultrasonic bonding modules 160 and 162.

Figure 11:
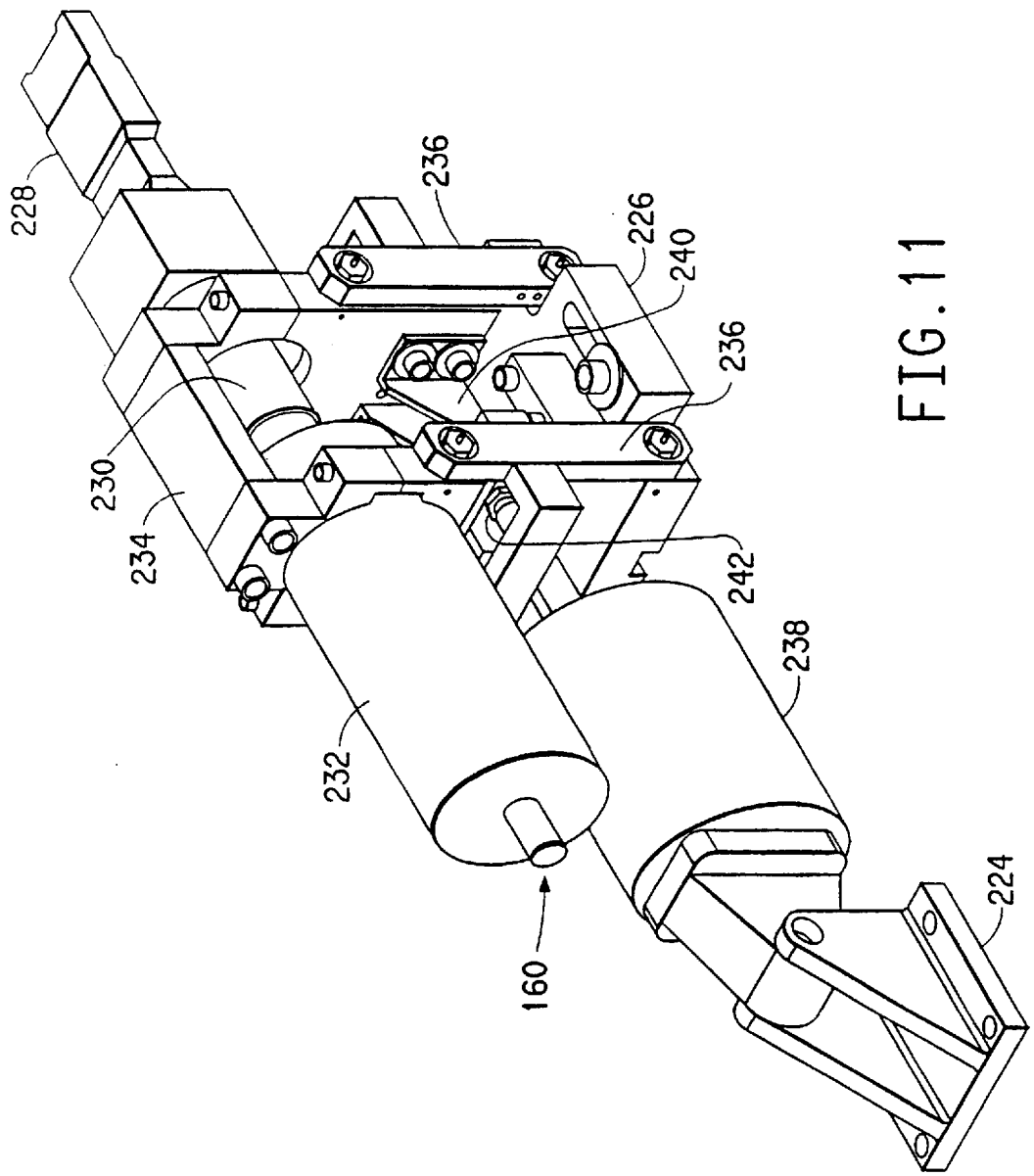
FIG. 11 shows an isometric view of an ultrasonic bonding module.

FIG. 11 shows an isometric view of the bonding module 160 which is the same as module 162, both of which are attached to frame 156 in an aligned relationship on opposite sides of the mandrel 152 by brackets, such as brackets 224 and 226. The basic bonding module comprises an ultrasonic horn 228 attached to a booster 230 and an ultrasonic driver 232 attached to frame 234. Frame 234 is attached to four-bar linkage assembly 236 (two bars shown) which is attached to bracket 226. Fluid cylinder 238 is attached to frame 234 by clevis bracket 240 on the rod end 242 and to bracket 224 on the cylinder end. Motion of the fluid cylinder rod end 242 causes the ultrasonic driver, booster, and horn assembly to move in a direction toward and away from the mandrel 152 while staying perpendicular to mandrel 152 to thereby squeeze the yarn between the horn and strand on the mandrel; the mandrel in this position acts as an ultrasonic anvil. Squeezing together of the yarn and strand while ultrasonic energy is applied to the horn causes the yarn and strand to rapidly heat, thereby causing the yarn filaments to fuse to each other and to the strand where they are in contact. The yarn does not stick to the horn nor does the strand stick to the mandrel. The fluid cylinder pressure determines the squeezing force exerted between the mandrel and horn and the yarn and strand therebetween. This force is an important factor determining the amount of ultrasonic energy coupled to the yarn and strand. Other factors are the horn vibrational amplitude and frequency.

FIGS. 14A–14C show the shape of the horn that permits one horn to bond two strands to the yarn at one time. In this way, only two horns are needed to bond the four strands guided along one four-sided mandrel. The horn 228 has two angled surfaces 244 and 246 that squeeze the yarn and strand (neither shown) against the corners 248 and 250, respectively, of the mandrel 152. The surfaces are long enough so that if a larger mandrel 152' is used, the same horn 228 can still engage the yarn and strand against the corners of the mandrel 152'. For a square mandrel as shown, the surfaces 244 and 246 are at 45 degrees to the side 252 of the mandrel as shown at 254. For a hexagonal mandrel with one horn bonding on two adjacent corners, this angle would be 30 degrees. The shape of the surface 246 (and surface 244) is shown in the enlarged section view in FIG. 14B to have an angled lead-in with a radius 256 to guide the yarn under the horn. To resist wear, the angled surfaces are preferable coated with amorphous diamond available from Tetrabond, Inc., Division of Multiarc, Inc., Rockaway, N.J. Another coating that may work well is a chemical vapor deposited coating of titanium carbide and a further coating of titanium nitride. Another coating is a diamond coating according to U.S. Patent Reissue 29,285 (reissue of U.S. Pat. No. 3,936, 577) practiced by Surface Technologies, Inc. of Robinsville, N.J. The yarn would be traveling in the direction of arrow 258. In FIG. 14C the depth 260 of the horn 228 is small to minimize horn stress created by the length of surfaces 244 and 246, and is large enough to clear all yarns expected to be used with the desired mandrel. The width 262 of the horn 228 is about 12.7 mm (0.5 inches) and is a function of the ultrasonic amplitude, frequency, and power of the driver.

Referring to FIG. 13, each horn, such as horn 228, is used to bond two support strands, such as strands 45a and 45d, to the yarn 43 wrapped thereon. This is preferably done by arranging the angled surfaces 264 and 266 of horn 228 so they are essentially perpendicular to imaginary planes passing through the strands and bisecting the included angle defined by the yarn on the two sides of each strand. In this way, when the yarn is cut to form the cut pile tuftstring, the tufts on the sides of the strand form the same angle at the base of the tufts where they are bonded on. Imaginary plane 268 passes through strand 45a and bisects included angle 270 between the ends 272 and 274 of yarn 43 bent over strand 45a. Surface 266 is essentially perpendicular to plane 268 as indicated at 276. Similarly, imaginary plane 278 passes through strand 45d and bisects included angle 280 between the ends 282 and 284 of yarn 43 bent over strand 45d. Surface 264 is essentially perpendicular to plane 278 as indicated at 286. Notice that the imaginary planes 268 and 278 also intersect at the center or centroid of the cross-section of mandrel 152.

Referring to FIGS. 12 and 13, the yarn 43 is wrapped over four spacers 288, 290, 292, and 294 on the sides of the mandrel 152. The spacers are held in shallow slots in the sides of the mandrel. The purpose of the spacers is to increase the circumference of the mandrel seen by the yarn before the yarn is bonded. The spacers terminate at position 296 adjacent the horns 228 and 228'. If the yarn is nylon 6-6, it has been found that the yarn contracts significantly upon cooling from the ultrasonic heating, so as the yarn moves away from the horns, it passes beyond the spacers at 296 and can contract to a smaller circumference without binding on the mandrel.

Figure 15C:
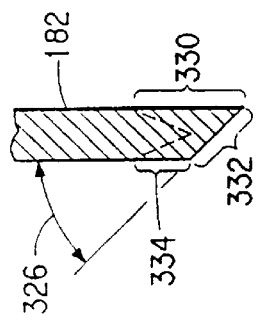
FIG. 15C is an enlarged view of the cutting edge of the blade shown in FIG. 15A.
Figure 15B:
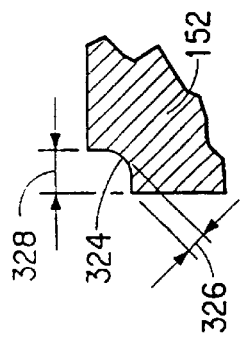
FIG. 15B is an enlarged detail section view of the groove in the corners of the mandrel shown in FIG. 15A.
Figure 15A:
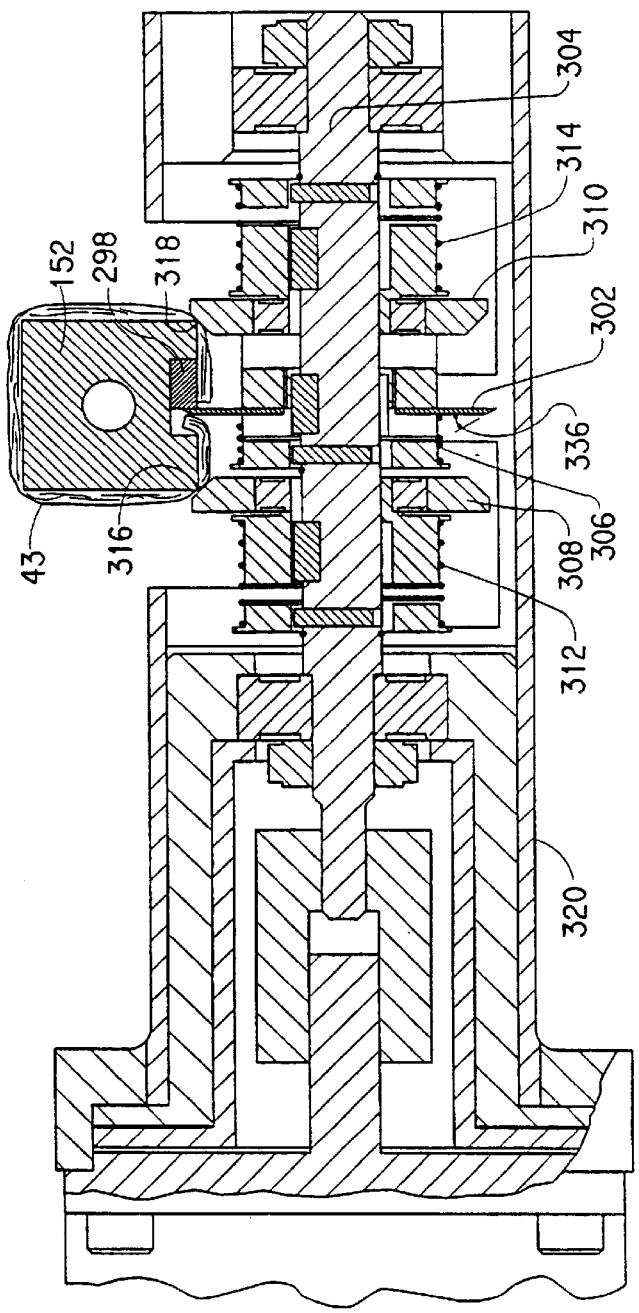
FIG. 15A is a section view of a cutter for cutting yarn on the mandrel.

After bonding, the yarn 43 must be cut to release it from the mandrel 152. When cut precisely midway between the strands the cut end may determine the final tuft height of the yarn when the tuftstring is assembled into a carpet. When cut and assembled precisely, no further tuft shearing is needed in the final carpet product, although for some products, shearing may still be preferred. The cutter arrangement 168 in FIG. 10 consists of four rotating circular blades each bearing against a bed knife fixed to the mandrel. One such bed knife 298 is shown mounted in a slot 300 in mandrel 152 in FIG. 12. FIG. 15A shows section view 15-15 from FIG. 10. Circular blade 302 is rotationally keyed to shaft 304, is axially slideable along the shaft, and is urged by spring 306 against bed knife 298. Circular clamps 308 and 310, one on each side of the blade, hold the yarn and support strand securely in the grooves in the corner of the mandrel. The clamps are rotationally supported by, but are free of torque from shaft 304; and are axially slideable along the shaft. The clamps are free to rotate independently of the shaft driven by movement of the strand. Springs 312 and 314 urge clamps 308 and 310, respectively, toward corners 316 and 318, respectively, of the mandrel 152. The clamps securely hold the strand in the groove on the corners of the mandrel (and the yarn bonded to the strand) while the blades exert a cutting force on the face yarn to cut it. The shaft 304 is rotatably supported in housing 320 and is rotatably driven by motor 322 (partially shown). FIG. 15B shows an enlarged view of a groove 324 in the corner of mandrel 152. The groove has a depth 326 and a width 328 about equal to the major diameter of the strand. The bottom on depth 326 should be chrome plated to provide a smooth sliding surface for the strand. Depth 326 may be between about 25% and 75% of the thickness, or minor diameter, of the strand to securely hold it, and still not interfere with surfaces 244 and 246 of the horn during bonding, and still support the yarn free of the mandrel for transport along the mandrel before bonding. For a 0.71 mm (28 mil) diameter strand, a groove width of 0.66 mm (26 mils) and depth of 0.20 mm (8 mils) have been found to work well.

As the bonded yarn and strands are propelled along mandrel 152, the yarn is pulled against the rotating blade 302 which cuts the yarn as it is trapped between the blade and bed knife. For efficient cutting of nylon 6-6 yarn, it has been found that a blade material of C-11 grade, submicron, tungsten carbide coated at the periphery with amorphous diamond (available from Tetrabond, Inc., Division of Multiarc, Inc. of Rockaway, N.J.) works well against a bed knife of D2 high speed tool steel. Referring to FIG. 15C, the portions of the blade that are preferably coated are portions 330, 332, and 334. The amorphous diamond coating has a Vickers hardness of about 6000 units. Another coating that may work well is a chemical vapor deposited coating of two (2) microns of titanium carbide and a further coating of two (2) microns of titanium nitride. Such a coating would have a Vickers hardness of about 2600 units. For improved life of the blade and bed knife surfaces, it has been found useful to apply a cooling lubricant of water and a yarn finish, such as an alkyl phosphate, to the side surface of the blade using a felt applicator pad kept moist by use of an intravenous-type drip system or the like. Such a finish may be Zelex® NK anti-static yarn finish available from E. I. du Pont de Nemours and Company. The anti-static yarn finish is mixed with distilled water in a 0.5–2.0% volume ratio of finish in the mixture. The blade is believed to be most effective in cutting the yarn without undue wear by rotating the blade in the direction of yarn advance and at a peripheral speed slightly above (about 3–10%) the speed of the yarn passing under the blade. It is believed the low speed reduces the wear rate and the direction of rotation minimizes any yarn tension increase during cutting. This causes a shearing action versus a sawing action where the peripheral speed of the blade is a lot faster (about 500–1000% greater) than the yarn advance. However, acceptable cutting can occur when the blade is rotated in the direction opposite the yarn advance and/or at a high speed so a sawing action occurs. When using the shearing action, the cutting edge angle 336 (FIGS. 7A and 7C) on the blade is preferably about 75 degrees (45 degrees for sawing), and the finish on the coated portions 330, 332, and 334 of the cutting edge is about 1–2 microinches rms. Although a stationary bedknife and spring loaded blade have been described for urging the blade and bedknife together, it is possible to mount the blade 302 rigidly on shaft 304 and make the bedknife 298 moveable in mandrel 152 and spring loaded against the blade 302. It is also possible to place the blade close to the bedknife without touching it, as will be explained below referring to FIG. 19, and have the blade shaped as indicated by the dashed lines in FIG. 15C.

Figure 16:
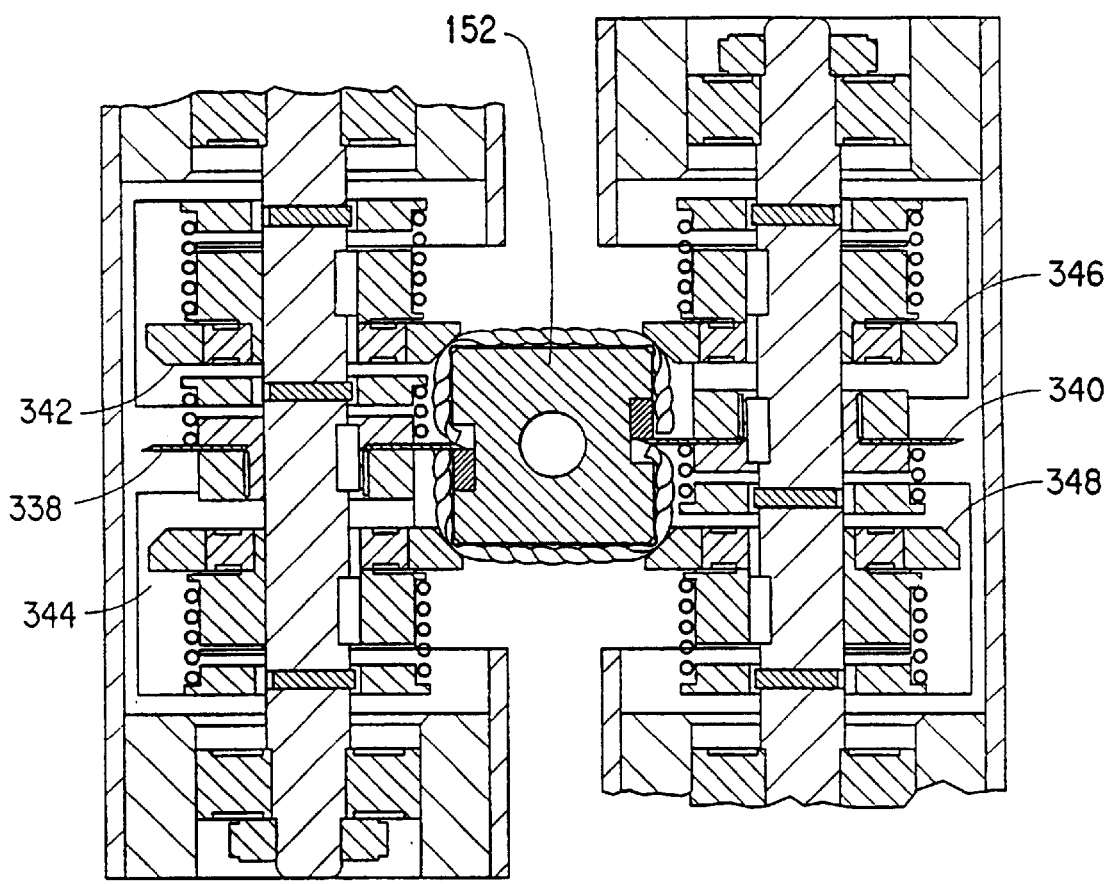
FIG. 16 is an enlarged section view of two cutters engaged with the mandrel shown in FIG. 15A.

When cutting the yarns on the mandrel two blades can cut the yarn on opposite sides of the mandrel at the same longitudinal position (and at the same time) since the cutters do not interfere with one another on opposite sides. The cuts can also be made by cutters spaced apart longitudinally along the mandrel. This is possible since the clamps hold the strand and attached yarn securely in the grooves on the corners of the mandrel as the cutters apply slight tension to the yarn during cutting. The clamps counter the tendency for this tension to pull the strand out of the groove. FIG. 16 shows two cutters with blades 338 and 340 that may be at the same longitudinal position on opposite sides of the mandrel 152. In these cases, as the cuts are being made, rotating clamps 342 and 344 hold the yarn cut by blade 338, and clamps 346 and 348 hold the yarn for blade 340. The clamps are shown aligned with the blade, but they would also work if arranged on a shaft separate from the blade and placed adjacent the upstream side of the blade closer to intersection of the blade and bedknife where the yarn is cut.

Figure 18A:
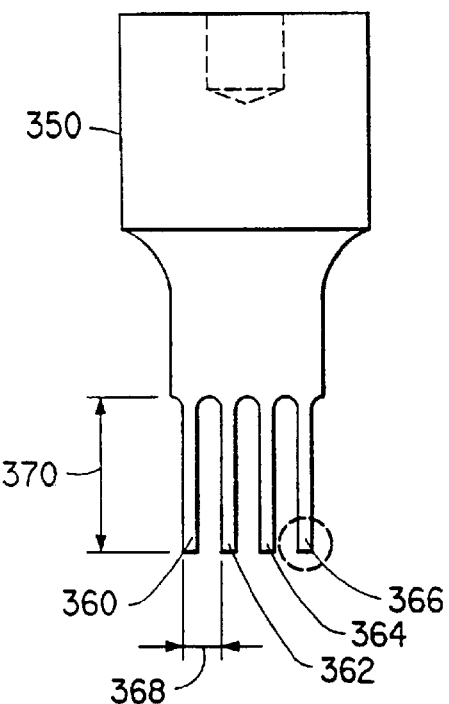
FIGS. 18A, 18B, 18C, 18D, and 18E are different views of an ultrasonic horn useful for bonding tuftstrings from the topside of a backing material.
Figure 18B:
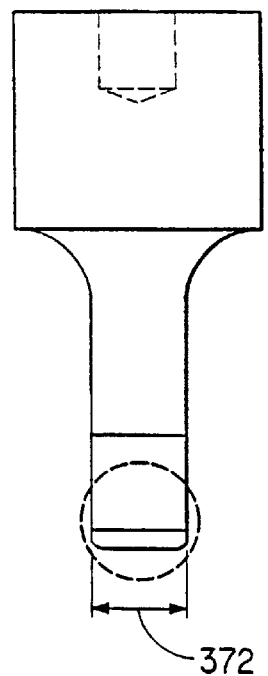
Figure 18C:
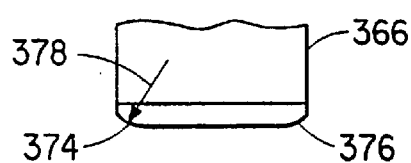
Figure 18D:
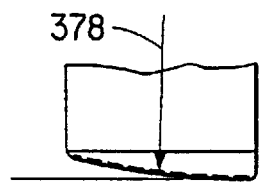
Figure 18E:
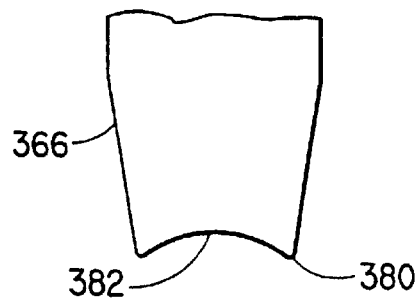

It is desireable to wind several tuftstrings onto cylinder 82 at the same time to speed up the production of the carpet. In this case, there are a plurality of tuftstring guides for accurately guiding the plurality of tuftstrings onto the backing and under the ultrasonic horns for bonding. FIG. 17A shows an enlarged side view of a first tuftstring bonding horn 350 and a second horn 352 for bonding closely spaced, multiple tuftstrings; and a tuftstring bonding guide 354 for guiding closely spaced, multiple tuftstrings into alignment with the first horn 350. Each horn is mounted into a bonding module similar to that shown in FIG. 10 for bonding the yarn to the support strand on the mandrel. Each horn is forced in a radial direction, such as shown by arrow 356 for horn 350, to squeeze the tuftstring against the backing substrate 90 and against the drum 82. The first horn is used to lightly tack the tuftstring to the backing while maintaining the alignment determined by guide 354, and horn 352 can apply more energy to the still heated tuftstring to securely attach it to the backing. A large amount of energy can be rapidly put into bonding the tuftstring by the additive effect of two horns. The distance 273 between horns 350 and 352 should be kept short to take advantage of this effect but this distance also provides some time for the heat from the first horn to penetrate the support strand. At low speeds where a lot of energy does not need to be added rapidly, only the first horn may be needed. This two-horn technique may also be useful when bonding the face yarn to the strand on the tuftstring forming mandrel. The horn 350, for instance, is shown in more detail in FIGS. 18A–E. The horn in FIG. 18A has four forks 360, 362, 364, and 366, each designed to fit between the tufts on a single tuftstring and contact the support strand at the base of the tufts. The spacing 368 between forks is the same as the desired tuftstring spacing on the finished carpet. For different tuftstring spacings, different horns would be used with fork spacings. The height 370 of the forks corresponds to the maximum length of the tufts on the tuftstrings for the desired maximum tuft height in the finished carpet. The horn has a length 372 in FIG. 18B that is a function of the ultrasonic amplitude, frequency, and power of the driver. FIG. 18C shows a typical detail of the leading end 374 and trailing end 376 of fork 366 that shows a slight radius 378 to help guide the tuftstring smoothly under the horn. FIG. 18D shows another possible shape of the fork where radius 378' extends the length of the fork so the pressure is gradually applied as the tuftstring slides under the horn. Other shapes may also be beneficial, and first horn 350 may have a different shape than second horn 352. FIG. 18E shows a typical detail of the profile of the tip 380 of fork 366 that has a concave surface 382 that guides the support strand along the length 372 of the fork to keep it from sliding to the side out from under the fork during bonding. This concave surface extends throughout the radius 378 and 378' to aid in tracking the tuftstring strand under the horn before the pressure and vibration of the horn acts on the tuftstring.

Referring to FIG. 17B, guide 354 has a plurality of slots, such as slot 384, that has a narrow width 386 that forces the tufts on the tuftstring in toward one another and over the support strand. The slots for the plurality to tuftstrings converge to a spacing that equals the desired spacing of the tuftstrings in the final carpet assembly. The slots guide the tuftstrings at the proper spacing to the horn that has forks at the same spacing and is closely spaced to the end 388 of the guide 354. The tuftstrings approach the horn at an angle of about 15 degrees to the surface of the drum so the concave surface in the horn helps in tracking the tuftstring. At the forks, the tufts for the tuftstring guided thereto separate so one row of tufts passes along one side of a fork and the other row passes along the other side of the fork and the tip of the fork 380 is over the support strand and pressing against it. On one side 390 of horn 350, the previously bonded tuftstrings must be pushed aside by plow 392 so individual tufts don't get trapped under the guided tuftstring and bonded under the horn. On the opposite side 394 of horn 350, there are usually no previously bonded tuftstrings present, so a support finger 396 is attached to guide 354 to support the outer tuft on that side of the horn. Finger 396 extends adjacent horn 352 and beyond to hold the tufts up until the bond cools. If the outer tuft is not supported by finger 396, it has been found that the outer tufts tend to lay over slightly during heating and as the bonded tuftstring cools so that in the final carpet assembly this row of tufts produces a visible "streak" different than adjacent rows, even after shearing of the tufts, so the carpet has a defect called rowiness.

After bonding is stopped on drum 82, the drum continues rotating a short distance and there is a plate 398 mounted under guide 354 that can be urged in the direction of arrow 400. The plate 398 is urged under the guided, but unbonded, tuftstrings and horns 350 and 352 so the guide, tuftstrings and horns can be lifted for tuftstring cutting, removal of the finished carpet, and threading of a fresh piece of backing onto the drum. The guide, tuftstrings, and horn can be lowered and the plate withdrawn so the tuftstrings are in place against the fresh backing and under the horn ready for bonding and restarting of the carpet making process.

The tuftstring process is particularly amenable to using pre-dyed yarn (solution-dyed yarn) since the creel of yarn required can be significantly smaller than with conventional carpet tufting operations. A small creel is an advantage when the creel must be changed for every color change for the carpet. When pre-dyed yarn is used in a tuftstring carpet, the carpet structure must go through a separate bulking process since other steps that provide bulking in conventional carpet systems, such as the carpet dyeing operation and latex drying operation, are not necessary.

The single mandrel tuftstring former 150 in FIG. 10 or module 55 in FIG. 5 require some special control considerations that can best be discussed referring to FIG. 10. In order to start and stop the ultrasonic bonding process and produce acceptable product, the ultrasonic horn amplitude and horn pressure must be ramped up and down as the speed of the tuftstring ramps up and down. During steady state running, the tension on the yarn, support strand, and tuftstring must be monitored and controlled, and the ultrasonic power monitored and controlled to be constant. For example, distributed ultrasonic controller 409 (shown with tuftstring forming module 150 in FIG. 10) is connected to ultrasonic drivers 232 and 232' connected to horns 228 and 228'. Machine controller 405 is connected to distributed controller 409 and to other elements, to be discussed below, that are shown with coiled lines segments.

In addition to the elements already discussed referring to FIG. 10, the tuftstring forming module also includes four motors in the cutter arrangement 168; voltage-to-pressure regulators 452 and 454, cylinders 238 and 238', and ultrasonic drivers 232 and 232' for bonding modules 160 and 162,respectively; valves 456, 458, and 460 for cylinders 176, 184, and 196, respectively; and tensiometer 462 for monitoring the tension on one of the completed tuftstrings, and tensiometer 464 for monitoring the tension on the corresponding strand, e.g., strand 45a.

Motor 402 is responsible for pulling the strand through the mandrel 152, along the mandrel ridges, and pulling the tuftstring after the yarn is bonded on the strand and cut. When starting the tuftstring forming module, the speed of servo motor 402 is monitored by an attached resolver, and the force exerted by cylinders 238 and 238' on the ultrasonic modules is ramped up and the horn amplitude exerted by ultrasonic drivers 232 and 232' is ramped up. Both the force and amplitude are ramped in a linear proportion to the ramping rate of the speed of motor 402. There may be some slight delay to account for response delays in the horn and cylinder with the intent that the horn always bonds all yarn to the strand without overbonding and severing any yarn filaments. The force is controlled by machine controller 405 controlling the individual signal to each voltage-to-pressure regulator, such as 452 and 454, on each bonding module. The amplitude is controlled by machine controller 405 controlling the signal to each ultrasonic driver, such as 232 and 232', on each bonding module. When the motor 402 is up to a steady state speed, the machine controller changes from amplitude control to power, or energy, control to maintain stable bonding conditions. The force is held constant, and the amplitude is varied to maintain constant power to each ultrasonic driver and horn. It has been discovered that the ultrasonic driver efficiency changes as the unit heats up during continuous operation. Changing the amplitude to maintain constant power corrects for this changing efficiency so stable bonds are produced. The horn itself has also been observed to heat up. Cooling air can be directed through conduits 455 and 457 to limit the temperature rise experienced by the horn bonding surface; cooling air may also be directed at the drivers.

When stopping the tuftstring, the machine controller changes from constant power control and the reverse procedure for starting is implemented to ramp down the amplitude and force as motor speed 402 ramps down. The baseline for the amplitude is that amplitude sampled just before stopping is executed, since the amplitude is changing as the constant power control is operated. Typical times to ramp the tuftstring speed from about zero to fifteen (0–15) yard-per-minute (YPM) is about three to five (3–5) seconds. It has been found in some cases, only the force needs to be ramped at start and stop and the amplitude held constant, but the preferred operation is to ramp both force and amplitude.

During operation of the tuftstring forming module 55 or 150 directly coupled to the cylinder 82, the drive for the cylinder also pulls the tuftstring so the tension of the tuftstring must be monitored by a single tensiometer, such as tensiometer 462 for module 150 even when an additional module may be used for more tuftstrings. The speed of motor 402 is then adjusted by machine controller 405 to keep the tuftstring tension constant. This prevents overtension and slack that may upset the process and break the tuftstring. Likewise, the strand tension must also be monitored by a single tensiometer 464 for each tuftstring forming module 150, and the speed of motor 404 is adjusted by machine controller 405 to keep the strand tension constant. The tensiometers 462 and 464 are set up to measure the same strand line before and after the yarn is bonded to make a tuftstring.

The yarn feed roll motor 406 and wrapper motor 220 are controlled by machine controller 405 so the tension is maintained constant in yarn 43 being fed in and wrapped on mandrel 152. The controller sets the wrap speed to achieve the number of strands per centimeter (inch) desired along the strand per operator instructions from the operator panel 407. The speed of motor 406 is set proportional to the speed of wrapper motor 220 to achieve the desired tension based on trial and error. A tensiometer could be used on the yarn line between feed roll 174 and spindle entrance end 214, if desired, to aid in setting up the tension and controlling it, but a fixed speed ratio has been found to work well.

Although the invention has been described in terms of making a cut pile carpet, the tuftstring forming module 150 or 55 can be fitted with a mandrel modules suitable for making loop pile tuftstrings. Such mandrel module would be based on the loop pile tuftstring apparatus and process described in U.S. Pat. No. 5,470,629 incorporated herein by reference. In this case, more mandrels may be required since one mandrel makes only one loop pile tuftstring, although each loop pile tuftstring has two rows of loops so fewer tuftstrings would be required in the carpet to get the same coverage as a cut pile tuftstring. The loop pile tuftstring would be forwarded to the carpet forming cylinder 82 as desired to form a loop pile tuftstring carpet. Guiding and bonding techniques similar to those described for cut pile tuftstring would be used.

There are also other variations possible with the carpet assembly of the invention using tufts attached to a strand to form tuftstrings that are attached to a backing. By providing multiple yarns in the yarn supply 43, such as 43a and 43b, and winding them on the mandrel 152 as shown in FIG. 5, it is possible to distribute a variation in the yarn in a controlled manner throughout the face of the carpet. Although variations in the cross direction (XD) are possible in both the conventional and tuftstring carpets by making variations in the yarns from one strand to the next or one tuftstring to the next in the XD, variations in the MD are not possible in the case of a conventional tufted carpet that introduces only a single continuous strand repeatedly in a straight or zigzag line in the machine direction (MD) of the carpet. It may be desired, for instance, to sparsely introduce a particular effect throughout the face of the carpet. Such an effect may be a colored yarn, an antistatic yarn, an antimicrobial yarn or one with other chemical features, an inexpensive yarn, a yarn with different texture, twist level, finish, dtex (denier), etc. For instance, the yarn for one tuftstring may comprise three yarns with only one of them being the desired effect yarn, and the next adjacent two tuftstrings assembled to the backing may not have the effect yarn at all. The effect then is distributed sparsely in both the MD and XD of the carpet.

The use of a continuous strand in the carpet assembly offers the possibility for additional variations in the carpet of the invention which would not be possible with conventional tufted carpets without costly additional steps after the carpet has been formed. For instance, antistatic filaments may be incorporated in some or all of the tuftstring support strands by placing them in the core of the strand during strand formation. This would be combined with antistatic filaments in some or all of the tuft yarns to provide enhanced antistatic automotive carpet performance for specialized vehicles and the like where low static voltage buildup is important. The antistatic filaments in all the strands may be grounded to the vehicle frame.

It may also be possible to transmit signals from one edge of the carpet to the other through the strands by incorporating a stretchable element, such as an optical fiber, in the strand in some or all of the tuftstrings. Other variations in effects and functionalities that are inherently possible with the tuftstring carpet assembly will be evident to those skilled in the art using the teachings herein.

Figure 19:
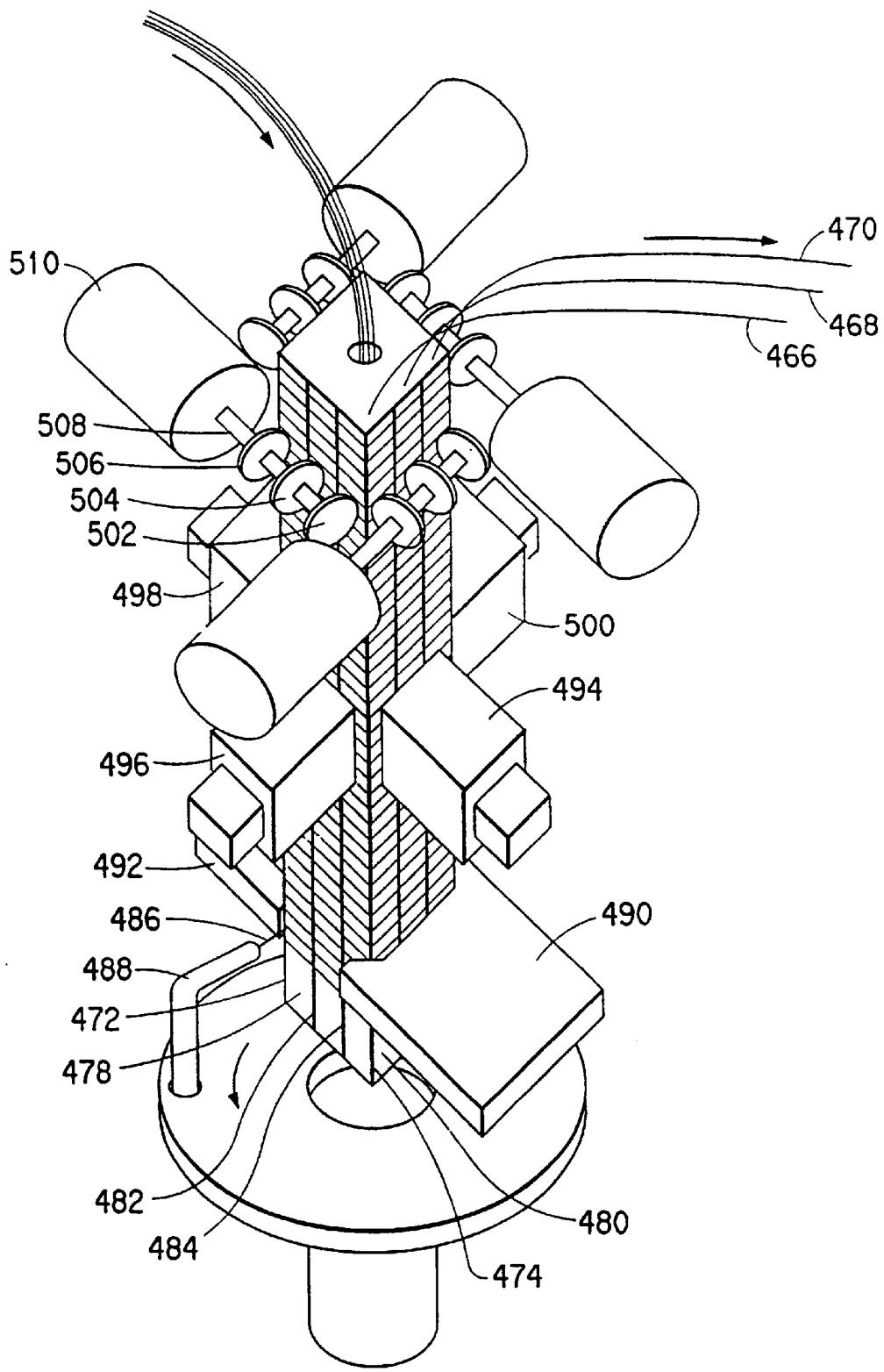
FIG. 19 is an isometric view of another tuftstring bonding device for making twelve tuftstrings.

FIG. 19 shows an alternate process for making tuftstring useful in an automotive tuftstring carpet. On this mandrel, strands are additionally conducted in guide grooves along the flat surfaces of the mandrel and bonded to the wrapped pile yarn by horns located there. FIG. 19 shows a mandrel for making 12 tuftstrings, such as those schematically indicated at 466, 468, and 470. The mandrel 472 has guide grooves on ridges positioned at the corners, such as corners 474 and 476, for guiding four support strands, and guide grooves on the side surfaces between the ridges, such as surfaces 478 and 480, for guiding two additional support strands on each surface for a total of eight more strands. On surface 478, there are shown two strands, 482 and 484, each in a guide groove (not shown). Yarn 486 is wrapped over all the strands by wrapper 488 to form loops of yarn around the mandrel and support strands. Corner bonding ultrasonic horns 490 and 492 bond the yarn 486 to the corner strands as described earlier referring to FIGS. 13 and 14A–14C. Alternatively, four separate horns could be used with one on each corner for individual control of bonding parameters for each tuftstring. Bonding of the corners is important for transporting the wrapped yarn loops before bonding on the side surfaces. Ultrasonic horns 494, 496, 498, and 500 bond the wrapped yarn to strands on the side surfaces using the mandrel as an ultrasonic anvil. There may be replaceable inserts (not shown) used for the groove portion directly under the horns so worn groove areas could be simply replaced without replacing the entire mandrel. Spacers (not shown) would be provided to accommodate yarn shrinkage during bonding as described earlier referring to FIGS. 12 and 13.

After all strands are bonded to the yarn 486, the yarn 486 is cut between the strands by 12 cutting blades located at the same position along the length of the mandrel 472, such as blades 502, 504, and 506 on one shaft 508 driven by motor 510. Each blade intersects a slot in the mandrel (not shown) with about a 0.25 mm (10 mil) clearance on each side. The blades may be made from a variety of materials as previously discussed, which includes a ceramic, such as ittria stabilized zirconia available from Ceramco, Inc., Center Conway, N.H. The blade entering the slot may be from 0.8 to 1.6 mm (0.03 to 0.06 inches) thick with a sharp end at the perimeter having an included angle of from 20 to 45 degrees. When the blades are all cutting at the same position along the mandrel, the strands do not have to be held in the grooves on the corners and side surfaces. The grooves for the strand and attached yarn 486 holds all the strands from lateral motion during cutting. After cutting it is not critical that the strands remain in their grooves. The position of the blades relative to the strands determines the pile height of the tuftstring. The tuftstrings, such as tuftstrings 466, 468, and 470, that are separated at cutting are individually conducted away from the mandrel for winding onto reels or spools (not shown).

Figure 20A:
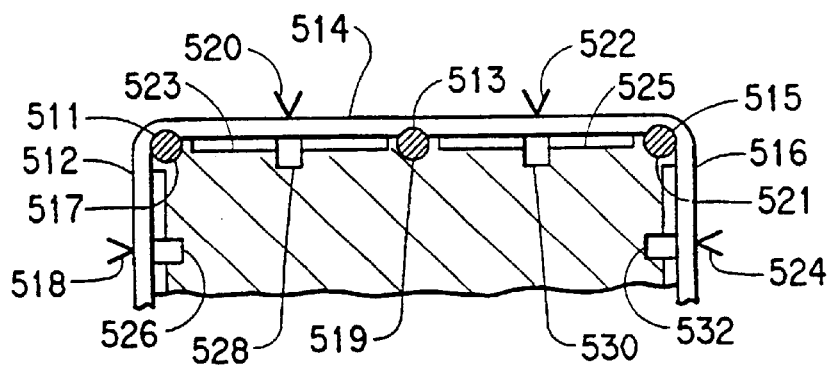
FIGS. 20A, 20B, and 20C are schematic section views of a mandrel to show different arrangements for using a mandrel to make a variety of pile heights.
Figure 20B:
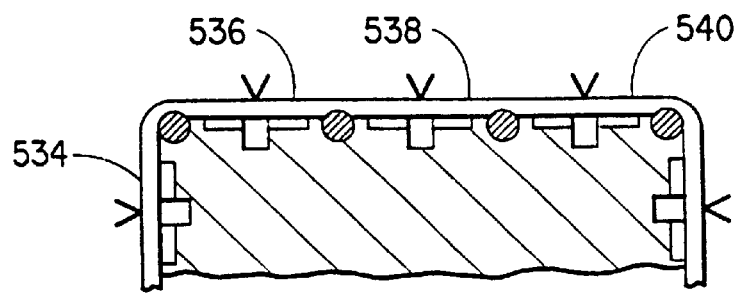
Figure 20C:
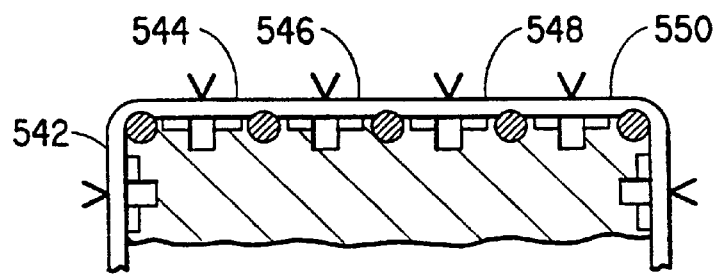

The mandrel 472 may be provided with a variety of grooves for making tuftstrings having a variety of different pile heights. FIGS. 20A, 20B, and 20C show end views of two corners and one side of mandrel 472 for making a variety of pile heights. FIG. 20A shows three tuftstrings 512, 514, and 516 that would provide a pile height of 9.7 mm (0.38 inch) for a mandrel 38.1 mm (1.5 inches) on a side. Strands 511, 513, and 515 are guided by grooves 517, 519, and 521 respectively. The mandrel has relieved channels, such as channels 523 and 525 extending between guide grooves on the mandrel in the vicinity of the side surface bonders, such as ultrasonic horn 494. These channels prevent bonding of one loop of pile yarn to an adjacent loop of pile yarn between support strands along the sides of the mandrel. Cutter blades 518, 520, 522, and 524 would be provided in slots 526, 528, 530, and 532 respectively for cutting the tuftstrings from the mandrel. FIG. 20B shows the same mandrel with four tuftstrings 534, 536, 538, and 540 having a pile height of 6.4 mm (0.25 inches). FIG. 20C shows the same mandrel with five tuftstrings 542, 544, 546, 548, and 550 having a pile height of 4.8 mm (0.19 inches). In this way one mandrel can be provided with all the necessary grooves and cutter slots to make a variety of pile height products. The number of strands and cutter blades would be provided as required for a particular pile height.

Referring to FIG. 6, the tuftstring module 55 can run essentially continuously, while the carpet forming module 73 essentially runs as a discontinuous process making one carpet at a time after which it must be stopped, the carpet removed, and the system set up for the next carpet to be made. For efficiency in manufacturing, it may be desireable to separate the continuous function from the discontinuous function. This can be done by winding up the tuftstrings on packages at position 72 that can be automatically changed while the tuftstring module continues making tuftstring. The wound packages of tuftstring can be fed into the carpet making module 73 and easily started and stopped as the carpets are made and completed.

EXAMPLES

Example 1

Moldable Automotive Construction Based on Thermoplastic Backing and Strand

A carpet structure was fabricated in the following manner: first, a tuftstring was fabricated on a triangular mandrel similar to that shown in FIGS. 5 and 6. The tuftstring was formed at 1.8 meters (2 yards) per minute by wrapping two strands of 1546 dtex total (1405 total denier), producer colored, bulked continuous multifilament nylon 6,6 yarn, produced commercially by the E. I. du Pont de Nemours and Company, around the triangular mandrel. A monofilament sheath/core strand was used for the tuftstring strand. The ultrasonic power used to bond the pile yarn to the strand was 30 watts and the ultrasonic tool loading on a 19.1 mm (¾ inch) long tool was approximately 10,500 kg/sq m (15 psi). There were 10.2 (26) single wraps of the 1546 dtex (1405 denier) yarn per centimeter (inch) of strand used to create the tuftstring. A disc knife cut the yarn immediately after bonding to release it from the mandrel and create a cut pile, and the pile was further trimmed via a shearing device to a pile height, measured from the base of the strand, of 7.9 mm (5/16th inch). This resulted in a tuftstring with a weight of 2.8 grams per linear meter (2.6 grams per linear yard).

The strand used was a sheath/core monofilament, of circular cross section, 0.71 mm (28 mils) in total diameter. The core was composed of polypropylene copolymer in an 80/20 blend of polypropylene (Fina 3868—a polypropylene homopolymer) and grafted polypropylene (POXT1015 anhydride modified polypropylene that provides increase adhesion to nylon) and the sheath was composed of a copolymer of nylon 6 and nylon 6,6 in a ratio available as Capron® 1590 resin from E. I. du Pont de Nemours and Company. The weight ratio of polypropylene copolymer to nylon copolymer was 50/50. The outer surface of the strand was uninterrupted; that is, it was a single, cylinder-like, continuous, polymer surface that was free of convolutions and crevices typical of a surface comprised of a plurality of small filaments or a plurality of twisted filaments. Such an uninterrupted surface is suitable for bonding with multifilament pile yarn and subsequently drawing and stretching the strand without breaking the bond with the pile yarn. The tuftstring was loosely coiled in a drum for further processing.

A pile construction was then formed by feeding a single tuftstring end through a guide and ultrasonically bonding it to a backing mounted on a drum mandrel as shown in FIGS. 6, 7, 8, and 9 using a single ultrasonic horn with a single blade. The second horn shown in FIG. 8 was not used since a slow speed was employed.

The backing 90 consisted of three separate layers. One layer, mounted against the cylinder, consisted of 0.034 kg/sq m (1 oz per square yard) Sontara® nonwoven, non-bonded web made of spun-laced multifilaments of nylon 66 staple fibers that have been hydro-entangled. Sontara® nonwoven is available from E. I. du Pont de Nemours and Company. The middle layer was an extruded sheet of Keldax® 6868 calcium carbonate filled thermoplastic material (also available from E. I. du Pont de Nemours and Company) 0.64 mm (25 mils) in thickness, like that typically used in the automotive carpet industry for sound-deadening in automotive floors. The upper-most layer was a 0.025 mm (1 mil) film of DuPont Bynel* film formed from DuPont CXA 41E557 maleic anhydride modified polyethylene resin. The tuftstring was feed through guiding devices and then onto the cylinder where it was ultrasonically bonded to the three layer backing material continuously at 2.0 tuftstrings per centimeter (5 tuftstrings per inch) backing width, using a power setting of 58 watts for the ultrasonic tool and at a speed of about 1.8 meters/min (2 yds/min).

Sections of this carpet structure were then further treated by placing them in a press for one minute under 35,150 kg/sq m (50 psi) pressure, where the platen touching the pile side of the sample was held at room temperature while the platen touching the backing side was held at one hundred fifty (150) degrees C. The application of heat and light pressure caused the nonwoven backing, which was clearly visible on the back surface before pressure treating, to become impregnated by the Kedlax® material inner layer and tightly laminate to it. Additionally, the base of the tuftstrings were pressed into the surface of the 0.64 mm (25 mil) Keldax® material layer, causing a slight ribbing effect on the backing surface opposite the tuftstring, and effectively increasing the contact area between the tuftstring base and the backing material. Pressing the tuftstrings into the backing is an important step to increase adhesion of the tuftstring to the backing. It was observed that, after this treatment, the tuftstrings were very well adhered to the backing such that it was very difficult to peel off individual tuftstrings from the backing.

Other means of attaching the fabric cover layer to the Keldax® material support layer would be to prelaminate these in a laminating press or between rolls before bonding the tuftstrings to the backing substrate. Other means of embedding the tuftstrings into the backing substrate may be by locally softening the backing substrate and applying sufficient tension to the tuftstring to deform the backing as it is wound onto the backing substrate on the cylinder.

A scouting test was administered to determine the ability to heat and deform this carpet structure. It was carried out in the following manner. A circular sample, 26.7 cm (10.5 inches) in diameter, of the above carpet construction was cut and mounted between two pieces of an annular machined aluminum support frame, tightly securing an outer 12.7 mm (0.5 inch) ring of the carpet edge using several bolts connecting the two annular pieces of the annular support frame. The carpet, securely held in the support frame, was then placed, backing side up, in a small oven approximately 2 cubic feet in volume, set to a temperature of 150 C. A thermocouple attached with a small piece of Kapton® adhesive tape to the center of the sample on the back side was used to monitor temperature. After an oven dwell time of approximately five minutes, the thermocouple temperature read one hundred fifty (150) degrees C. The carpet sample, still secured in the annular support ring, was quickly removed using insulated gloves and placed on a annular support, mounted in an Instron testing machine, such that the backing faced up. A plunger, attached to the Instron motion arm, consisting of a 10.2 cm (4 inch) diameter polished aluminum hemisphere mounted on a 25.4 mm (1 inch) diameter rod, was caused to impinge the carpet sample at a rate of 50.8 cm (20 inches) per minute. As the plunger impinged the sample, the sample carpet was deformed, and the load and stroke distance where recorded. The sample was monitored during stretching visually by observing the pile side of the carpet. The motion was stopped as soon as dark backing showed clearly between the tuftstring pile rows, or a tear failure occurred. The deformation distance was recorded at this point as a indication of the maximum ability to mold-shape the carpet construction, as is often done for automotive flooring materials.

The above carpet fabrication and testing sequence was repeated for other tuftstring constructions varying the material of composition of the strand used in the tuftstring. The following strand materials were evaluated in carpet samples all having the same backing structure described above:

Example 2

Sheath/Core of 50/50 wt. composition; core: Crystar 1995 polyethylene terephthalate, sheath: Capron® 1590 Nylon 6/66 copolymer. Approximate strand sheath melting point is one hundred sixty five (165) degrees C.

Example 3

Nylon 6,12 monofilament comprising a copolymer of nylon 6,12/Novolac/Capron® 1590 (60/20/20% by weight, respectively). The Novolac is a poly-phenol polymer additive available from Schenectady Chemical Co. and is useful in this blend to lower the melt temperature and improve adhesion of nylon 6,12 in the strand to the nylon 6,6 pile yarn. Approximate strand melting point is two hundred fifteen (215) degrees C.

Example 4

Nylon 6 monofilament. Approximate strand melting point is two hundred twenty three (223) degrees C.

Example 5

3410 dtex total (3100 total denier) sheath/core staple wrapped strand made on a DREF machine; Core: continuous glass multifilament core—1595 dtex (1450 denier); sheath: 2.0 dtex/f (1.8 dpf), 38.1 mm (1.5 inch) staple length fiber comprising a copolymer of nylon 66/MPMD (70/30% by weight respectively). Approximate strand sheath melting point is one hundred fifty (150) degrees C.

Example 6

Tufted Control: 0.47 kg/sq m (14 oz/sq yd) pile yarn comprising 3.2 mm (⅛ inch) gage tufted 1546 dtex (1405 denier) singles BCF, 7.9 mm (5/16th inch) pile height; woven slit polypropylene primary backing, ELVAX resin binder adhesive precoat and 0.64 mm (25 mil) Keldax® 6868 sound barrier laminated together. The table below shows the failure limits recorded and maximum force of deformation.

| Carpet Sample (Strand) | Deformation | | Max. Force | |
|---|---|---|---|---|
| | (cm) | (Inch) | (N) | (Lbs) |
| Ex. 6) Tufted Control | 10.2 | (4.0) | 2113 | (475) |
| Ex. 1) Polypropylene/Nylon | 9.5 | (3.75) | 445 | (100) |
| Ex. 3) Nylon 6, 12 | 8.9 | (3.50) | 667 | (150) |
| Ex. 4) Nylon 6 | 6.4 | (2.50) | 1112 | (250) |
| Ex. 2) Polyester/Nylon | 5.5 | (2.15) | 445 | (100) |
| Ex. 5) Nylon/Glass | 3.2 | (1.25) | 222 | (50) |

The measure of success for formability of carpets in automotive applications can be different for various carpet applications. However, it is expected that carpet material which can be deformed at least 7.6 cm (3.0 inches) will be useful for a variety of automotive shaped carpet applications. Looking at the samples which failed at a deformation of less than 7.6 cm (3.0 inches), samples 4 and 2 had strands with melting points which are quite a bit higher than the molding temperature of the Keldax® polymer (150 degrees C.), so they provided significant resistance to deformation so failure occurred at a low force and low deformation. Sample 5 had a strand with a core of continuous glass filaments which also resisted deformation at one hundred fifty (150) degrees C., although the sheath had a melt point at the same temperature. Samples 1 and 3 had strand melting points close enough to one hundred fifty (150) degrees C. to deform easily at the one hundred fifty (150) degrees C. test temperature. Therefore, it is anticipated that thermoplastic strand constructions having a melting point less than about two hundred twenty (220) degrees C. will be compatible for molding construction described above involving combinations of Keldax® 6868 sound deadening material normally processed at approximately one hundred fifty (150) degrees C. in the industry. Based on the above scouting test, it appears that the polypropylene/nylon sheath/core strand of sample 1, and the nylon 6,12 monofilament strand of sample 3 would be good strand candidates for a moldable tuftstring carpet.

This test is not relevant for tuftstring mats which do not get stretched and molded. In this case, it is anticipated that strands in samples 1, 2, 3, 4, and 5 would be acceptable candidates.

The strands for the sample tuftstrings were also drawn to failure on an Instron machine to examine their expected draw force performance.

| Sample | Modulus | | Break load Elongation | | | Load at 15% elongation | |
|---|---|---|---|---|---|---|---|
| | kg/sq m | (PSI) | newtons | (Lbs) | % | newtons | (lbs) |
| 1 | 62,600 | (89) | 19.6 | (4.4) | 321 | 1.25 | (0.28) |
| 3 | 67,500 | (96) | 33.4 | (7.5) | 112 | 5.8 | (1.3) |
| 4 | 308,600 | (439) | 124.5 | (28) | 186 | 13.8 | (3.1) |
| 2 | 48,500 | (69)* | 115.6 | (26) | 326 | 9.3 | (2.1) |
| 5 | 428,900 | (610) | 36.9 | (8.3) | 2.3 | broke > 44.5 | (10) |
| N6, 6 | 337,500 | (480) | 151.2 | (34) | 227 | 13.8 | (3.1) |

*this value is an anomaly and is not considered valid

The N6,6 stand was a reference point representing the strand suggested in U.S. Pat. No. 5,547,732 (Edwards et al.).

The carpet samples that performed well, samples 1 and 3, used strands that had low modulus and low load of 8.9 newtons (2.0 lbs.) or less at 15% elongation which is the maximum for a tuftstring at the 7.6 cm (3.0 inch) ram deflection considered acceptable performance for a moldable tuftstring carpet. As a screening test, it is believed this is an acceptable way to identify good strand candidates for moldable tuftstring carpets.

Example 7

Tuftstring for an Automotive Mat Construction Containing Bristles

A tuftstring suitable for fabrication of automotive mats containing a blend of two pile fiber types of widely variant dtex (denier) was fabricated. One of the pile fibers was 1546 dtex total (1405 total denier), 19.4 dtex/f (17.6 dpf), producer colors bulked continuous filament automotive carpet yarn, while the second pile fiber was 743 dtex (675 denier) monofilament nylon fiber.

A tuftstring was formed in the following manner. Two multifilament feed strands of 1546 dtex total (1405 total denier), 19.4 dtex/f (17.6 dpf), yarn and two feeds of 743 dtex (675 denier) nylon 66 monofil were fed from a creel and brought together without added twist (over end takeoff introduces a very low level of twist) in an eyelet and further feed to the wrapping mechanism for a triangular mandrel tuftstring module of FIG. 6. The grouped pile yarns were wrapped on a triangular mandrel such that there were approximately 8.7 (22) single wraps per centimeter (inch) each of 1546 dtex (1405 denier) BCF yarn and 8.7 (22) single wraps per centimeter (inch) of monofilament pile fiber. The tuftstring was formed at 1.8 meters (2 yards) per minute. The pile fibers were bonded to the strand using an ultrasonic tool as described in Example 1, set to a power of 44 watts. The pile fiber was cut with a rotating disc knife to free it from the mandrel and form a cut pile, and further trimmed to a pile height of 7.9 mm (5/16th inch) at a shearing station.

The strand material to which the two pile fiber components were bonded was a 3410 total dtex (3100 total denier) strand composed of a continuous glass multifilament core of 1595 dtex (1450 denier), and a staple fiber sheath of 1815 dtex total (1650 total denier). The sheath fiber was 2.0 dtex per filament (1.8 dpf), 38.1 mm (1.5 inch) cut length, nylon copolymer fiber which was wrapped onto the continuous glass fiber using the Dreft textile process to form the sheath around the glass fibers. The nylon copolymer composition was 70/30 nylon 66 and MPMD. It was observed that both the 1595 dtex (1405 denier) 19.4 dtex/f (17.6 dpf) pile fiber, and the heavy 743 dtex (675 denier) monofil bonded to this strand material securely such that this tuftstring could be collected for further processing. FIG. 22 shows the tuftstring formed in the above manner arranged in closely spaced rows and attached to a backing substrate similar to that described referring to FIG. 3. It can be usefully employed as automotive and industrial carpets and mats which have the combined features of excellent automotive carpet aesthetics, a novel dirt removal feature for cleaning occupant's shoes, and improved wear resistance provided by the bristles.

Example 8

Automotive/Floor Mat Construction Using Tuftstrings

A carpet mat structure was fabricated in the following manner: first, a tuftstring was fabricated on a triangular mandrel similar to that shown in FIGS. 5 and 6. The tuftstring was formed at 1.8 meters (2 yards) per minute by wrapping two strands of 1546 dtex total (1405 total denier), producer colored, bulked continuous multifilament nylon 6,6 yarn, produced commercially by E. I. du Pont de Nemours and Company, around the mandrel. A staple wrapped sheath/core strand was used for the tuftstring strand. The ultrasonic power used to bond the pile yarn to the strand was about 30 watts and the ultrasonic tool load on a 19 mm (¾ inch) long tool was approximately 10,500 kg/sq m (15 psi). There were about 10.2 (26) single wraps of the 1546 dtex (1405 denier) yarn per centimeter (inch) of strand used to create the tuftstring. A disc knife cut the yarn immediately after bonding to release it from the mandrel and create a cut pile, and, in the case of the triangular mandrel, the pile was further trimmed via a shearing device to a pile height, measured from the base of the strand, of about 3.2 mm (⅛th inch). This resulted in a tuftstring with a weight of about 2.8 grams per linear meter (2.6 grams per linear yard).

The strand used was a 3410 dtex total (3100 total denier) sheath/core staple wrapped strand made on a DREF machine; Core: continuous glass multifilament core—1595 dtex (1450 denier); sheath: 2.0 dtex/f (1.8 dpf), 38.1 mm (1.5 inch) staple length fiber comprising a copolymer of nylon 66/MPMD (70/30% by weight respectively). Approximate strand sheath melting point is one hundred fifty (150) degrees C. The tuftstring was loosely coiled in a drum for further processing.

A pile construction was then formed by feeding a single tuftstring end through a guide and ultrasonically bonding it to a backing mounted on a cylinder as shown in FIGS. 6, 7, 8, and 9 using a single ultrasonic horn with a single blade. The second horn shown in FIG. 8 was not used since a slow speed was employed.

The backing 90 consisted of a single layer of uncured styrene butadiene rubber about 2.54 mm (100 mils) thick. It was mounted against the cylinder 82 which is covered with a release film. The tuftstring was feed through guiding devices and then onto the cylinder where it was ultrasonically bonded to the backing material continuously at 2.8 tuftstrings per centimeter (7 tuftstrings per inch) backing width, using a power setting of about 58 watts for the ultrasonic tool, a pressure on the tool of about 22.2 newtons (5 pounds), and at a speed of about 1.8 meters/min (2 yds/min). The force on the horn and the power used are only that necessary to temporarily tack the tuftstring to the backing 90 for further handling. It should be sufficient power and pressure to embed the tuftstring into the surface of the backing by about 0.13–0.76 mm (5–30 mils), however. It should be low enough in pressure and energy so the ultrasonic horn does not deform and weaken the backing under the tuftstring. The tuftstring and backing assembly thus formed represents a carpet mat preform that can be handled and shipped to a molding operation without damage.

Sections of this carpet structure (about 30.5×40.6 cm (12×16 inches) were then further treated by placing them on a mold plate in a press exerting about 9000–44,500 newtons (2000–10,000 pounds) force for about 20 minutes which produced about 7,030–35,150 kg/sq m (10–50 psi) pressure on the sample. The platen touching the pile side of the sample was held at room temperature, while the platen touching the mold supporting the backing side was held at one hundred seventy (170) degrees C. In this sample a pressure of 7,030 kg/sq m (10 psi) was used to achieve the necessary pressure for molding the nibs without using excess pressure that would crush the carpet pile yarn. By pre-embedding the tuftstring in the backing, a high pressure is not needed to ensure good empregnation of the SBR into the pile yarn of the tuftstring. The mold plate was an aluminum plate having holes for forming a plurality of spaced nibs on the bottom of the mat. A reinforced Teflon-coated sheet was placed between the mold plate and platen to prevent the SBR from inadvertently contacting the hot platen. The application of pressure held the assembly flat as it was heated and the combination with heat aided in further impregnating the tuftstrings into the backing, extruding nibs on the bottom side of the backing, and curing the SBR material. The molding time exceeding about 2 minutes is needed just to cure the SBR backing. After molding, the sample was removed from the press, placed carpet pile side down, and allowed to cool. The base of the tuftstrings were pressed into the surface of the 2.54 mm (100 mil) SBR backing by about 0.58 mm (23 mils) which is important for increasing the contact area between the tuftstring base, comprising the pile yarn, and the backing material. Embedding the tuftstrings into the backing is an important step to increase adhesion of the tuftstring to the backing. It was observed that, after this treatment, the tuftstrings were very well adhered to the backing such that it was very difficult to peel off individual tuftstrings from the backing. By pre-embedding the tuftstrings into the backing during the bonding step prior to application of heat and pressure in the press, a lower pressure in the press can be used to cure the SBR, and less crushing of the pile yarn is evident.

To test the durability of the sample, it was placed in a Vetterman Drum tester and subjected to 20,000 cycles. No separation of the tuftstrings from the backing was observed. Another duplicate sample was also placed in a Swivel Caster tester and subjected to 20,000 cycles. No separation of the tuftstrings from the backing was observed.

Example 9

Mat Preform Made by Embedding Tuftstring Into a Tacky Rubber Backing Without Ultrasonics A carpet mat preform suitable for molding into a finished mat was constructed in the following manner: First, tuftstring was formed on a square mandrel (as in a tuftstring forming module as in FIG. 10) at 9.1 m/min (10 ypm) from Nylon BCF 1546 dtex (1405 denier) yarn attached to a sheath/core strand comprising nylon staple sheath and a glass core; made on a DREF machine.

The yarn feed was two ends of 1546 dtex (1405 denier) BCF singles producer colored yarn manufactured by E. I. DuPont de Nemours and Company having a total dtex of 3091 (denier of 2810). The DREF strand was composed of glass multi-filament core of 1546 dtex (1450 denier) continuous glass fiber and a staple fiber sheath of 3.3 dtex/f (3.0 dpf) nylon 66/MPMD copolymer where the total sheath dtex was 1815 (denier was 1650) and the individual filaments were 3.3 dtex/f (3 dpf) and 45 mm (1.77 inch) cut length. The total dtex (denier) of the DREF strand was 3410 (3100).

The tuftstring was formed as described in the body of the patent on a square mandrel and cut to 6.4 mm (¼ inch) pile height on two opposite corners by shifting the cutters offcenter to create two tuftstrings with each having a total weight of 1.9 grams per meter (1.7 grams per yard). The two tuftstrings from the remaining corners had a long pile height not suitable for this test and they were discarded. It was observed that the pile on the tuftstring was deployed in two continous rows and that the strand showed clearly between the rows unobstructed by cross-over filaments. The filaments of each row were deployed at an angle of between ten (10) degrees and eighty (80) degrees from the base plane of the strand and formed two well defined loosely entangled rows.

A preform for a molded rubber backed mat was formed in the following manner: A 1.52 mm (60 mil) thick un-cured SBR rubber sheet having a composition of approximately 60% clay filler, 5% carbon black, 10% napthalenic oil, and 25% SBR rubber was mounted on a steel cylinder 91 cm (36 inches) in circumference and 91 cm (36 inches) in length similar to the cylinder 82 of FIG. 6. Double sided adhesive tape was used to secure the uncured rubber to the roll at the edges and at intervals along the sheet.

Figure 23:
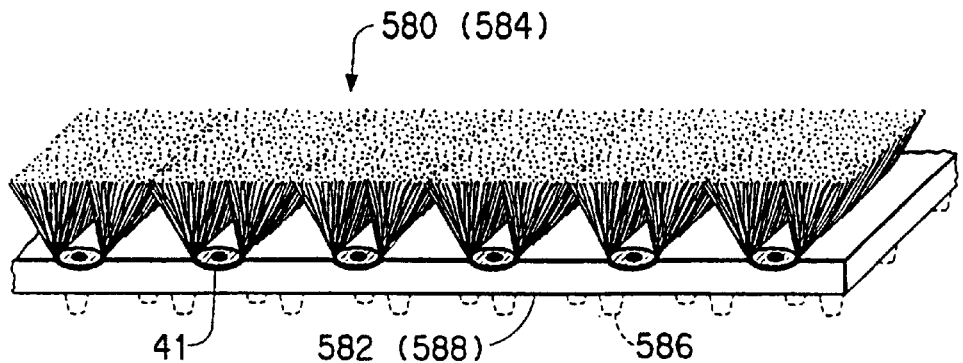
FIG. 23 is a tuftstring carpet mat having a backing comprising a rubber substrate.

Tuftstring from the above bonding process was piddled into a can and stored overnight for use the next day. The end of this tuftstring was then threaded through some simple z-path guides to create a small amount of back tension and then under a blade guide which pressed against the strand. The blade guide was 2.54 mm (100 mils) thick at its base with a guide groove at its base 0.64 mm (25 mils) in radius centered on the base of the blade and 0.64 mm (25 mils) in depth. The blade was 25.4 mm (1 inch) in length with a 25.4 mm (1 inch) radius curvature at the entry edge. The guide blade was centered on the strand such that as the tuftstring passed under the guide, the base of the tuftstring was forced to embed into the rubber. The rubber was 1.52 mm (60 mils) thick. The embedding guide was fixed at a 1.27 mm (50 mil) distance from the cylinder surface to achieve a 0.25 mm (10 mil) initial embedding of the tuftstring base into the rubber. It was observed that the tuftstring embedded in this manner into the rubber would stick sufficiently to the rubber to allow continuous winding of parallel rows of tuftstring onto the rubber at a guage of 8 tuftstrings per inch. It was also observed that the indenting of the tuftstring into the rubber caused the outer pile row to rotate upright somewhat thereby decreasing the space between the rows on the tuftstring. This enabled a deflection guide to efficiently further upright the pile row, just prior to laydown of the next row by the blade guide, creating uniform rows of uprighted pile. The full surface of the rubber mat was laid-on with a pile surface in this manner. Further, after completing the tuftstring winding, the pile surface was sprayed with a mist of water and a heat gun was used to heat the pile surface evaporating the water, further enhancing the bulk of the pile fiber and substantially eliminate the space between rows. This was observed to create a uniform pile surface material. The pile surface was cut at one point across the length of the cylinder and the rubber sheet and pile surface was removed from the cylinder. It was observed that the attachment of the tuftstrings to the rubber remained intact on removal from the cylinder and the this rubber and pile surface preform could be transported in the normal manner to a platen press. FIG. 23 shows a preform as described having tuftstings 41 attached to an uncured rubber backing 582.

Nine hundred twenty nine square centimeters (one square foot) of this pile covered, uncured, rubber backing was placed between the platens of a hydraulic press where the bottom platen was heated to 160 C. and contained a pattern of 2.5 mm (0.1 inch) diameter nib holes on 25.4 mm (1 inch) centers. The top platen was held at room temperature. A pressure of 352,000 kg/sq m (500 psi) was applied to the rubber and pile article for twenty minutes after which the platens were opened and the mat article removed. It was observed that the tuftstrings were well adhered to the rubber and that no bleed-through of rubber occurred into the pile surface.

FIG. 23 is also representative of a cured carpet mat (584) as just described with nibs 586 (shown dashed) molded into the bottom surface of the now cured backing (588). FIG. 23 is also representative of the ultrasonically joined tuftstrings and rubber backing assembled preform and finished mat of Example 8.

Figure 24:
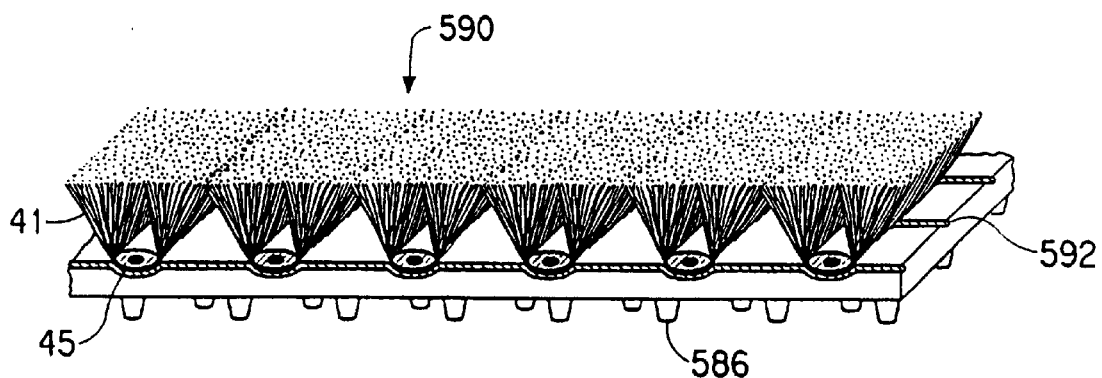
FIG. 24 is the mat of FIG. 23 with reinforcing strands in the cross-direction.

FIG. 24 shows a variation of the carpet mat preform/finished carpet of Example 9 as illustrated in FIG. 23. The preform/finished mat 590 has reinforcing strands 592 inserted perpendicular to the tuftstrings 41. These reinforcing strands 592 may be made from the same material as the tuftstring strands 45. These are added to the tacky surface of the backing before the tuftstrings are pressed into place. The reinforcing strands add to the strength of the backing in the direction perpendicular to the tuftstrings to balance the load carrying strength of the finished mat which has the tuftstring strands carrying the load in the tuftstring direction.

Figure 25:
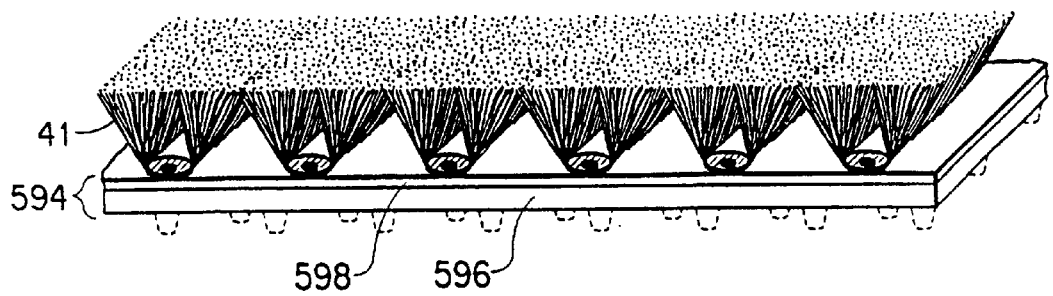
FIG. 25 is a tuftstring carpet mat having a backing comprising an adhesive-covered "Keldax" substrate.

FIG. 25 shows another variation of a carpet mat that is not intended to be drawn in a molding operation. It comprises tuftstrings 41 assembled to a backing substrate 594 comprising a composite of Keldax® 596 and a Bynel® adhesive layer 598. The tuftstring strand is preferably a sheath/core structure and includes a core of fiberglass multifilaments. It would be made by mounting the composite backing to cylinder 82 of FIG. 6 and ultrasonically attaching the tuftstrings to the adhesive surface of the backing to produce the preform shown in the FIG. 25. The preform would then be place briefly in a press similar to that described in Example 8 for a brief time since the Keldax does not require curing as does rubber. The heat and pressure of the press softens the adhesive Bynel layer and further embeds the tuftstrings into the backing substrate which improves the attachment strength between the tuftstring and backing.

Figure 26:
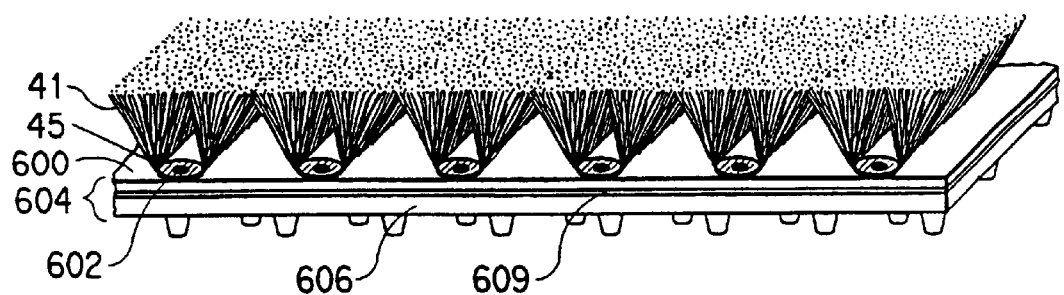
FIG. 26 a tuftstring carpet mat having the tuftstrings attached to a thin backing that is laminated to an adhesive-covered "Keldax" substrate.

FIG. 26 shows another variation of a carpet mat that is not intended to be drawn in a molding operation. It comprises tuftstrings 41 attached first to a backing substrate comprising a thermoplastic sheet material 600, which may also include reinforcing fibers and an adhesive film facing the tuftstrings 41. The tuftstring strand 45 is preferably a sheath/core structure with a fiberglass core 602. This sheet material 600 may comprise conventional tufted carpet primary backing materials or may comprise a special tuftstring carpet backing material described in U.S. Pat. No. 5,470,648 (Pearlman), incorporated herein by reference. The backing of the Pearlman patent comprises a composite structure of a layer of non-bonded, non-woven nylon sheet adhesively attached to the top and bottom of a fiberglass scrim. This subassembly of tuftstrings and sheet material is then laminated to a sub-backing 604 of a Keldax® layer 606 covered with an adhesive layer 609 of Bynel®. The carpet assembly is placed in a platen press and heated until the assembly is securely united. This produces a mat that is unusually strong and stable, but at an increased cost over those mats of FIGS. 23, 24, and 25.

Figure 27:
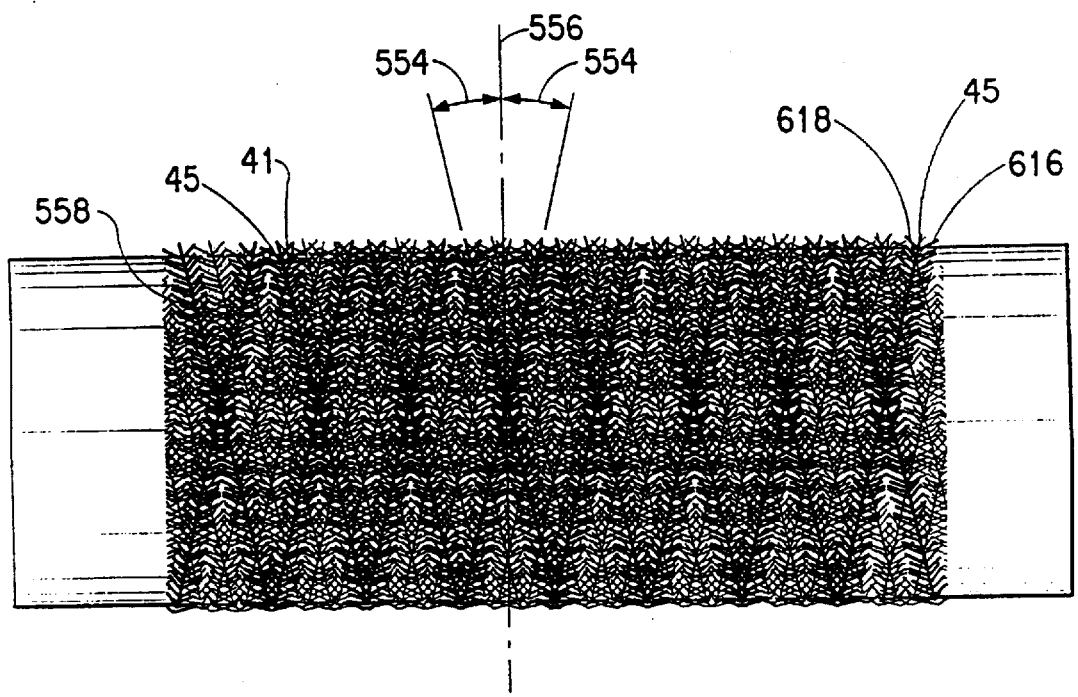
FIG. 27 is a partial side view of a wound package of tuftstring.

FIG. 27 shows a close-up portion of a wound package 552 of tuftstring. Surprisingly the tuftstring 41 can be guided and layed down on a package surface 558 with a conventional yarn winder, such as made by Leesona, without twisting or damaging the pile yarn. The tuftstring can also be backwound off the package and used to make a carpet with good appearance. This is possible by winding under low tension (about 100 grams) and at a low helix angle 554 measured off a reference line 556 perpendicular to the package winding axis. Preferably, the helix angle 556 is plus or minus ten to thirty (+/− 10–30) degrees. The monolithic pile structure provides torsional stability to resist twisting and it keeps the filaments together at the crossovers and during backwinding. The Figure shows the tuftstring wound on with the strand 45 facing outward and the base region of the tuftstring facing inward. A substantial portion of the filaments in the rows 616 and 618 are oriented substantially parallel to the package surface 558 so the strand remains accessible. A conventional traverse and guide are used to guide the tuftstring on the package. The tuftstring can also be wound onto the package with the strand facing inward and the base region of the tuftstring facing outward. In this orientation a larger portion of the filaments of each row are oriented substantially parallel to the package surface since the strand tension tends to flatten the pile rows.

Figure 28:
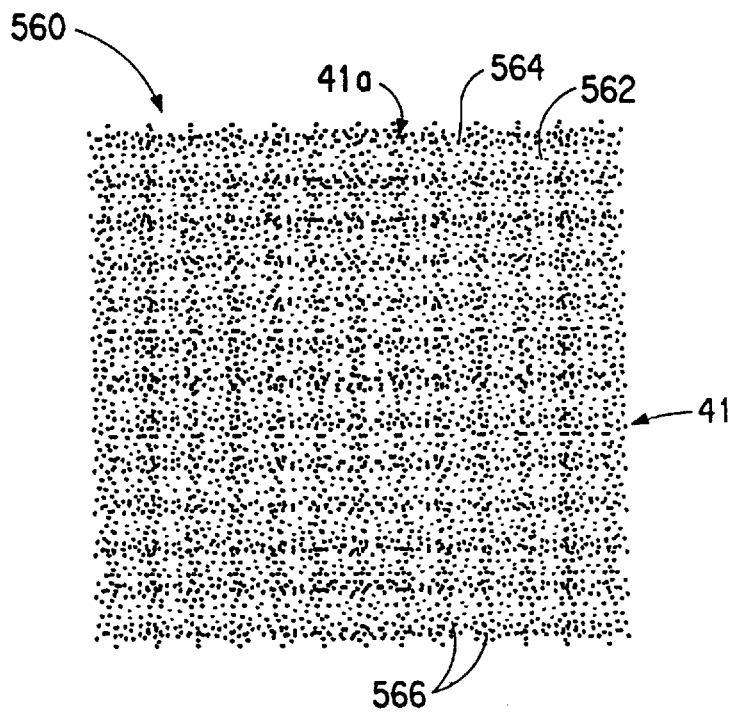
FIG. 28 is plan view of a portion of a tuftstring carpet made with tuftstrings oriented at zero degrees and ninety degrees on a backing.

FIG. 28 shows a unique tuftstring structure of the invention. It is a carpet structure 560 where the tuftstrings 41 and 41a are arranged at zero and ninety degrees respectively on a backing substrate. This results in a "waffle" pattern of pile yarn on the carpet and the pattern has a three dimensional surface with wells 562 and valleys 564 between ridges 566 of pile yarn. The structure is made on the carpet forming module 73 in FIG. 6 by first placing a backing substrate on the cylinder 82 and then spirally winding and ultrasonically bonding a first tuftstring at a wide pitch of about 12.7 mm (½ inch) to the backing. The backing is then cut off the cylinder and reoriented so the tuftstrings are arranged along the axis of cylinder 82. A second tuftstring is then spirally wound at a pitch of 12.7 mm (½ inch) over the first tuftstring and ultrasonically bonded to the backing and to the first tuftstring where the two cross. This same pattern can also be made by spirally winding a single tuftstring at a helix angle of about 45 degrees back and forth along the cylinder 82 and building up the tuftstring coverage until there is a tuftstring every 12.7 mm (½ inch) in both helix directions. In this way the bias of the pattern is aligned with the cylinder axis. The helix angle may be changed plus or minus twenty (+/−20) degrees to make patterns where the tuftstrings are at angles different than zero and ninety degrees. In general, a pile article can be arranged as a plurality of intersecting rows of tuftstrings to form a pile surface structure, by attaching them to a backing substrate in the following manner:

A first group of tuftstrings are arranged in first parallel rows spaced apart at a pitch of less than 1.6 tuftstrings per centimeter (four tuftstrings per inch) and attached to the backing substrate, the yarns at the point of attachment to the strand being attached to the backing substrate and the pile forming filaments arranged to create a pile surface spaced from the backing substrate;

A second group of tuftstrings are arranged in second parallel rows crossing said first parallel rows at a pitch of less than 1.6 tuftstrings per centimeter (four tuftstrings per inch), and attached to the backing substrate and to the first group of tuftstrings arranged in the first parallel rows, the yarns at the point of attachment to the strand being attached to the backing substrate and the pile forming filaments arranged to create a pile surface spaced from the backing substrate, whereby a waffle pattern is produced at the pile surface by a plurality of wells formed adjacent the intersections between the first and second parallel rows. The pitch may vary depending on the bulk and length of the pile yarn on the tuftstring so the pile substantially covers the backing substrate. About 0.3 tuftstrings per centimeter (0.75 tuftstrings per inch) is a practical minimum pitch for conventional automotive pile.

In FIG. 28 the tuftstring strands for tuftstrings 41 in the zero degree direction appear as dark lines as do the tuftstring strands for tuftstrings 41a in the ninety degree direction. These are the valley regions 564 in the third dimension. The wells 562 in the third dimension are where the tuftstring strands for tuftstrings 41 and 41a cross and these appear as dark spots. The lighter regions of the pattern are where the pile yarns from adjacent tuftstrings blend together as in the row 116 (not discernable) of one tuftstring blends with row 118 (not discernable) of the adjacent tuftstring. Such a three dimensional carpet structure, in addition to presenting an interesting pattern, may also function to capture and hide dirt in the well regions or channel away liquids in the valley regions.

There is sometimes a problem when making carpet mats on a backing substrate of uncured rubber, that the uncured rubber is too elastic and cannot be held securely on the cylinder 82 with tape applied only at the edges. When pressure is applied to embed the tuftstring into the backing, the backing stretches and a ripple forms behind the guide tool (unergized ultrasonic horn). This problem can be solved in several ways. One way is to apply a two-sided sticky tape to substantially cover the surface of the cylinder and apply the backing to the tape. This presents problems getting the assembled carpet cleanly off the cylinder and the tape must be replaced often. Another way is to provide a cylinder with a porous surface and apply a vacuum to the porous surface. The backing would be applied to the porous surface and be held securely by the vacuum. This would work well but it would be costly to fabricate the cylinder and continuously operate a vacuum source.

A third solution is discussed referring to FIG. 21 which comprises placing the uncured rubber backing 568 on the cylinder 82 and then wrapping a retaining cord 570 spirally over the surface of the backing. The cord 570 would be wrapped in a first rotational direction 572 and at a pitch that is the same as the desired tuftstring pitch. The tuftstring 41 would then be spirally wrapped over the backing 568 in a second rotational direction 574 opposite the direction of the retaining cord. As the tuftstring 41 is wrapped on the backing 568 in direction 576, the retaining cord 570 is unwrapped from the backing 568 in direction 578 just in advance of the tuftstring 41 so the cord 570 does not interfere with the placement of the tuftstring. The cord 570' still remaining on the backing is close enough to the placement position of the tuftstring so the backing is still held securely and no rippling or stretching of the backing occurs.

The tuftstring may be placed on a path on the backing which is spaced from the path of the retaining cord, or it may follow the path of the retaining cord. The retaining cord may not need to be layed onto the backing in a precise path as long as the pitch is the same as that of the tuftstring. If the retaining cord is layed down precisely, the tuftstring may be spaced from the retaining cord and the retaining cord left in place on the backing until all the tuftstring is bonded to the backing. The retaining cord may then be removed from between the tuftstrings, or the cord left in place held by the tacky uncured rubber surface. If left in place, it may help reinforce the backing. If it is desired to reinforce the backing in a direction at an angle to the tuftstring, the retaining strand may be wound in a spiral array that crossed that of the tuftstring, and the tuftstring would be bonded across the retaining strand.

What is claimed is:

1. An automotive pile article arranged as a preform for a pile surface mat, comprising:

an elongated support strand having a thermoplastic outer surface and having a width and a height, said strand comprises a core of continuous glass filaments and at least one multifilament staple yarn wrapped at least partially around said core;

a plurality of thermoplastic bulkable continuous filaments bonded to one circumferential region of the strand surface and along the length of said strand, said region defining a strand base, the filaments forming an elongated loosely entangled array of filaments extending outwardly from the strand in two spaced apart pile rows connected by a base region having a dense portion of filaments bonded together, the dense portion of the filaments being secured to said surface of the support strand at said base, the filaments in each row having a pile length measured from the strand of between 2.5 millimeters (0.1 inches) and 12.7 millimeters (0.5 inches);

said circumferential region along the length of said strand defining a base plane for said elongated pile article, and the pile filaments along a lower side for each row adjacent the base plane defining a lower filament plane for each row that is at an angular orientation within 10 degrees to said base plane, the angle having an origin in the base plane aligned with the width of the strand, and the filaments at the opposed upper side of each row defining an upper filament plane for each row that is at an angular orientation to said base plane of 45–90 degrees, to thereby contain the entangled array of filaments in said spaced apart rows such that said strand is accessible;

the pile article having a guide groove on one side of the strand and on an opposed side of the strand between the strand and the corresponding pile row thereby providing an elongated guide ridge formed by the strand which is accessible between said spaced apart rows, said pile article arranged in closely spaced rows of 6–10 pile articles per inch, and attached directly to a tacky uncured rubber sheet having a thickness of 0.8–5.0 mm (30–200 mils), where the base region of said pile articles is embedded into the rubber sheet to a depth of 0.13–0.64 mm (5–25 mils).

2. An automotive pile article arranged as a preform for a pile surface mat, comprising:

an elongated support strand having a thermoplastic outer surface and having a width and a height, said strand comprises a core of continuous glass filaments and at least one multifilament staple yarn wrapped at least partially around said core;

a plurality of thermoplastic bulkable continuous filaments bonded to one circumferential region of the strand surface and along the length of said strand, said region defining a strand base, the filaments forming an elongated loosely entangled array of filaments extending outwardly from the strand in two spaced apart pile rows connected by a base region having a dense portion of filaments bonded together, the dense portion of the filaments being secured to said surface of the support strand at said base, the filaments in each row having a pile length measured from the strand of between 2.5 millimeters (0.1 inches) and 12.7 millimeters (0.5 inches);

said circumferential region along the length of said strand defining a base plane for said elongated pile article, and the pile filaments along a lower side for each row adjacent the base plane defining a lower filament plane for each row that is at an angular orientation within 10 degrees to said base plane, the angle having an origin in the base plane aligned with the width of the strand, and the filaments at the opposed upper side of each row defining an upper filament plane for each row that is at an angular orientation to said base plane of 45–90 degrees, to thereby contain the entangled array of filaments in said spaced apart rows such that said strand is accessible;

the pile article having a guide groove on one side of the strand and on an opposed side of the strand between the strand and the corresponding pile row thereby providing an elongated guide ridge formed by the strand which is accessible between said spaced apart rows, said pile article arranged in closely spaced rows of 6–10 pile articles per inch, and attached to a thermoplastic sheet having a thickness of 0.8–5.0 mm (30–200 mils) with one surface covered with a thermoplastic adhesive film to form a composite backing, the pile article attached directly to the film, where the base region of said pile article is embedded into the composite backing to a depth of 0.13–0.64 mm (5–25 mils).

3. An automotive pile article arranged as a preform pile surface moldable carpet, comprising:

an elongated support strand having a thermoplastic outer surface and having a width and a height, wherein said strand comprises a support strand having an uninterrupted outer surface, the strand permanently drawable free of fracture up to 15% at a draw temperature of 150 degrees C. and a draw force of 9.0 newtons (2 pounds) or less at said draw temperature, to thereby limit the draw force required to draw the pile article;

a plurality of thermoplastic bulkable continuous filaments bonded to one circumferential region of the strand surface and along the length of said strand, said region defining a strand base, the filaments forming an elongated loosely entangled array of filaments extending outwardly from the strand in two spaced apart pile rows connected by a base region having a dense portion of filaments bonded together, the dense portion of the filaments being secured to said surface of the support strand at said base, the filaments in each row having a pile length measured from the strand of between 2.5 millimeters (0.1 inches) and 12.7 millimeters (0.5 inches);

said circumferential region along the length of said strand defining a base plane for said elongated pile article, and the pile filaments along a lower side for each row adjacent the base plane defining a lower filament plane for each row that is at an angular orientation within 10 degrees to said base plane, the angle having an origin in the base plane aligned with the width of the strand, and the filaments at the opposed upper side of each row defining an upper filament plane for each row that is at an angular orientation to said base plane of 45–90 degrees, to thereby contain the entangled array of filaments in said spaced apart rows such that said strand is accessible;

the pile article having a guide groove on one side of the strand and on an opposed side of the strand between the strand and the corresponding pile row thereby providing an elongated guide ridge formed by the strand which is accessible between said spaced apart rows, said pile article arranged in closely spaced rows of 6–10 pile articles per inch, and attached to a thermoformable sheet having a thickness of 0.8–5.0 mm (30–200 mils) with one surface covered with a thermoplastic adhesive film to form a composite backing, the pile article attached directly to the film, where the base region of said pile article is embedded into the composite backing to a depth of 0.13–0.64 mm (5–25 mils).

4. The pile article of claim 3, wherein the thermoformable sheet is a calcium carbonate filled thermoplastic material and the adhesive film is a polyethylene resin.

5. A molded carpet module shaped in a three dimensional non-planar contoured configuration for forming an original carpeted floor of a motor vehicle body assembly, wherein said carpet module comprises:

a pile article preform of claim 3 in which the surface of the composite backing opposite the tuftstrings is covered with a stretchable fabric stabilizing layer, the stabilizing layer being embedded in the composite backing.

6. The pile article carpet of claim 5, wherein the thermoformable sheet is a calcium carbonate filled thermoplastic material and the adhesive film is a polyethylene resin, and the fabric is a nonwoven, web of spun-laced multifilaments.

7. An automotive pile article arranged as an automotive pile surface structure, comprising:

an elongated support strand having a thermoplastic outer surface and having a width and a height, said strand comprises a core of continuous glass filaments and at least one multifilament staple yarn wrapped at least partially around said core;

a plurality of thermoplastic bulkable continuous filaments bonded to one circumferential region of the strand surface and along the length of said strand, said region defining a strand base, the filaments forming an elongated loosely entangled array of filaments extending outwardly from the strand in two spaced apart pile rows connected by a base region having a dense portion of filaments bonded together, the dense portion of the filaments being secured to said surface of the support strand at said base, the filaments in each row having a pile length measured from the strand of between 2.5 millimeters (0.1 inches) and 12.7 millimeters (0.5 inches);

said circumferential region along the length of said strand defining a base plane for said elongated pile article, and the pile filaments along a lower side for each row adjacent the base plane defining a lower filament plane for each row that is at an angular orientation within 10 degrees to said base plane, the angle having an origin in the base plane aligned with the width of the strand, and the filaments at the opposed upper side of each row defining an upper filament plane for each row that is at an angular orientation to said base plane of 45–90 degrees, to thereby contain the entangled array of filaments in said spaced apart rows such that said strand is accessible;

the pile article having a guide groove on one side of the strand and on an opposed side of the strand between the strand and the corresponding pile row thereby providing an elongated guide ridge formed by the strand which is accessible between said spaced apart rows, said pile article arranged in first parallel rows spaced apart at a pitch of less than 1.6 pile articles per centimeter (5 pile articles per inch) and oriented with the pile forming filaments arranged to create a pile surface spaced from the support strand;

said pile article arranged in second parallel rows crossing said first parallel rows at a pitch of less than 1.6 pile articles per centimeter (5 pile articles per inch), and attached to the pile articles arranged in the first parallel rows, the filaments at the point of attachment to the strand being attached to the first parallel rows with the pile forming filaments of the pile articles in the second rows arranged to create a pile surface spaced from the support strand, whereby a waffle pattern is produced at the pile surface by the pile of the pile articles and a plurality of wells formed adjacent the intersections between the first and second parallel rows.

8. The pile article of claim 7, further comprising:

a backing substrate attached to the filaments of the pile articles at the point of attachment of the filaments to the strand and opposite the pile surface.

* * * * *